(12) United States Patent
Starikova et al.

(10) Patent No.: US 9,582,829 B2
(45) Date of Patent: Feb. 28, 2017

(54) DYNAMICALLY MODIFYING AN APPLICATION QUESTIONNAIRE

(71) Applicant: Bank of America Corporation, Charlotte, NC (US)

(72) Inventors: Anna Vladimirovna Starikova, Santa Clarita, CA (US); Linda Ann Eddy, Clyde, NC (US); Brian Dunne, Medford, NJ (US)

(73) Assignee: Bank of America Corporation, Charlotte, NC (US)

( * ) Notice: Subject to any disclaimer, the term of this patent is extended or adjusted under 35 U.S.C. 154(b) by 217 days.

(21) Appl. No.: 14/270,483

(22) Filed: May 6, 2014

(65) Prior Publication Data

US 2015/0324908 A1    Nov. 12, 2015

(51) Int. Cl.
*G06Q 40/00* (2012.01)
*G06Q 40/02* (2012.01)

(52) U.S. Cl.
CPC ........... *G06Q 40/02* (2013.01); *G06Q 40/025* (2013.01)

(58) Field of Classification Search
CPC ............................. G06Q 40/02; G06Q 40/025
See application file for complete search history.

(56) References Cited

U.S. PATENT DOCUMENTS

| | | |
|---|---|---|
| 5,842,183 A | 11/1998 | Delfer, III et al. |
| 6,128,661 A | 10/2000 | Flanagin et al. |
| 7,017,243 B2 | 3/2006 | Carnevali |
| 7,050,996 B1 | 5/2006 | Blagg et al. |
| 7,225,226 B2 | 5/2007 | Fitzpatrick et al. |
| 7,318,046 B1 | 1/2008 | Wellons et al. |
| 7,353,182 B1 | 4/2008 | Missinhoun et al. |
| 7,497,373 B2 | 3/2009 | Mandalia et al. |
| 7,509,285 B1 * | 3/2009 | Maniar ............. G06Q 20/3674 705/35 |
| 7,523,397 B2 | 4/2009 | Cheung et al. |
| 7,559,217 B2 | 7/2009 | Bass |
| 7,606,752 B2 | 10/2009 | Hazlehurst et al. |

(Continued)

OTHER PUBLICATIONS

Starikova et al., U.S. Appl. No. 14/270,394, filed May 6, 2014, entitled "Providing Transaction History to a User During a Communication Session".

(Continued)

*Primary Examiner* — Edward Baird
(74) *Attorney, Agent, or Firm* — Michael A. Springs

(57) ABSTRACT

In some embodiments, a system calculates a user risk score, and determines a first subset of questions using the user risk score and type of user device. The system communicates and receives answers to the first subset of questions. The system determines a second subset of questions based on the answers to the first subset of questions. The system communicates and receives answers to the second subset of questions. The system determines whether the answers to the first subset of questions are accurate. If the verification indicates that the answer to one or more of the first subset of questions is not accurate, the system determines a third subset of questions. The system communicates and receives answers to the third subset of questions. The system determines a plurality of repayment plans based on the user risk score and the answers to the first, second, and third subset of questions.

20 Claims, 18 Drawing Sheets

(56) References Cited

U.S. PATENT DOCUMENTS

| | | |
|---|---|---|
| 7,623,650 B2 | 11/2009 | Dalton et al. |
| 7,627,648 B1 | 12/2009 | Mehta et al. |
| 7,647,252 B2 | 1/2010 | Rampell et al. |
| 7,653,573 B2 | 1/2010 | Hayes, Jr. et al. |
| 7,698,171 B2 | 4/2010 | Rampell et al. |
| 7,702,585 B2 | 4/2010 | Lyda et al. |
| 7,720,690 B2 | 5/2010 | Patrick et al. |
| 7,792,717 B1 | 9/2010 | Hankins et al. |
| 7,848,960 B2 | 12/2010 | Rampell et al. |
| 7,848,974 B1 | 12/2010 | Sheehan |
| 7,856,386 B2 | 12/2010 | Hazlehurst et al. |
| 7,861,176 B2 | 12/2010 | Weisberg |
| 7,899,847 B2 | 3/2011 | Lau et al. |
| 7,958,049 B2 | 6/2011 | Jamison et al. |
| 7,987,231 B2 | 7/2011 | Karkanias |
| 8,069,075 B2 | 11/2011 | Santos et al. |
| 8,072,926 B1 | 12/2011 | Billman |
| 8,146,807 B2 | 4/2012 | Wellons et al. |
| 8,219,689 B2 | 7/2012 | Kumar |
| 8,275,702 B1 | 9/2012 | Enriquez |
| 8,280,776 B2 | 10/2012 | Coulter et al. |
| 8,341,046 B2 | 12/2012 | Marchetti et al. |
| 8,355,983 B1* | 1/2013 | Parr .................. G06Q 40/025 705/35 |
| 8,392,330 B2 | 3/2013 | Sorbe et al. |
| 8,396,719 B2 | 3/2013 | Patrick et al. |
| 8,396,789 B1 | 3/2013 | Sudjianto et al. |
| 8,401,965 B2 | 3/2013 | Johnson et al. |
| 8,407,305 B2 | 3/2013 | Lazaridis et al. |
| 8,447,016 B1 | 5/2013 | Kugler et al. |
| 8,452,841 B2 | 5/2013 | Heiss et al. |
| 8,560,444 B2 | 10/2013 | Rosenblatt et al. |
| 8,594,283 B2 | 11/2013 | Hogan et al. |
| 8,600,876 B2 | 12/2013 | Smith et al. |
| 8,600,877 B2 | 12/2013 | Smith et al. |
| 8,602,786 B2 | 12/2013 | Takahashi et al. |
| 8,606,705 B2 | 12/2013 | Zanzot et al. |
| 8,621,536 B1 | 12/2013 | Hendren et al. |
| 8,627,204 B2 | 1/2014 | Coman et al. |
| 2003/0036996 A1* | 2/2003 | Lazerson .............. G06Q 30/02 705/38 |
| 2006/0036543 A1 | 2/2006 | Blagg et al. |
| 2006/0074794 A1 | 4/2006 | Nespola, Jr. |
| 2007/0083465 A1 | 4/2007 | Ciurea et al. |
| 2007/0174448 A1 | 7/2007 | Ahuja et al. |
| 2008/0133647 A1 | 6/2008 | Hamzeh |
| 2010/0017619 A1 | 1/2010 | Errico |
| 2010/0217706 A1 | 8/2010 | Griffin et al. |
| 2010/0325047 A1 | 12/2010 | Carlson et al. |
| 2011/0078073 A1 | 3/2011 | Annappindi |
| 2011/0122155 A1 | 5/2011 | Zechlin |
| 2011/0137788 A1 | 6/2011 | Mekle |
| 2011/0166911 A1 | 7/2011 | Newman et al. |
| 2011/0231778 A1 | 9/2011 | Hoag et al. |
| 2011/0289154 A1 | 11/2011 | Bang |
| 2011/0295731 A1 | 12/2011 | Waldron, III et al. |
| 2012/0005053 A1 | 1/2012 | Burgess et al. |
| 2012/0036449 A1 | 2/2012 | Minnis et al. |
| 2012/0060087 A1 | 3/2012 | Jame et al. |
| 2012/0084197 A1 | 4/2012 | Petralito et al. |
| 2012/0173330 A1* | 7/2012 | Rodin .................. G06Q 30/0251 705/14.49 |
| 2012/0197717 A1 | 8/2012 | Rampell et al. |
| 2012/0197731 A1 | 8/2012 | Rampell et al. |
| 2012/0197855 A1 | 8/2012 | Chen |
| 2012/0221420 A1 | 8/2012 | Ross |
| 2013/0041798 A1 | 2/2013 | Unger |
| 2013/0054435 A1* | 2/2013 | Zhang .................. G06Q 40/02 705/35 |
| 2013/0074167 A1 | 3/2013 | Bailey et al. |
| 2013/0080304 A1 | 3/2013 | Smith et al. |
| 2013/0226798 A1* | 8/2013 | Orttung ................ G06Q 20/027 705/44 |
| 2013/0268840 A1 | 10/2013 | Skirpa |
| 2013/0282595 A1 | 10/2013 | Vijayaraghavan et al. |
| 2013/0290167 A1 | 10/2013 | Laky et al. |
| 2013/0293363 A1 | 11/2013 | Plymouth et al. |
| 2013/0317993 A1 | 11/2013 | Wasserman et al. |
| 2014/0025570 A1 | 1/2014 | Jones et al. |
| 2014/0052606 A1 | 2/2014 | Vasudevan et al. |
| 2014/0372269 A1* | 12/2014 | Ternan .................. G06Q 40/00 705/35 |

OTHER PUBLICATIONS

Starikova et al., U.S. Appl. No. 14/270,401, filed May 6, 2014, entitled "Preparing a Bank Application Using a User Device".

Starikova et al., U.S. Appl. No. 14/270,396, filed May 6, 2014, entitled "Developing an Automated Alert Notification Plan for a User".

Starikova et al., U.S. Appl. No. 14/270,418, filed May 6, 2014, entitled "Developing a Hierarchy of Repayment Plans".

Starikova et al., U.S. Appl. No. 14/270,420, filed May 6, 2014, entitled "Automated Follow-Up Communications to Unsuccessful Communication Attempts".

Starikova et al., U.S. Appl. No. 14/270,484, filed May 6, 2014, entitled "Adapting a User's Communication Channel in Accordance With Communication Channel Triggers".

Starikova et al., U.S. Appl. No. 14/270,447, filed May 6, 2014, entitled "Integrating Information From Various Lines of Business".

Starikova et al., U.S. Appl. No. 14/270,410, filed May 6, 2014, entitled "Adapting an Alert Notification According to User Data".

Starikova et al., U.S. Appl. No. 14/270,543, filed May 6, 2014, entitled "Customizing Content Presentation Format in Accordance With the Category of Device Used to Access the Content".

Starikova et al., U.S. Appl. No. 14/270,522, filed May 6, 2014, entitled "Scheduling Future Payments to an External Payment Service".

* cited by examiner

Bank Online Banking

Profile & Settings | Sign Off
Search

| Accounts | Bill pay | Transfers | Cash Back Deals | Tools & Investing | Open an Account | Help & Support |

Customer Assistance: Past Due Payment Reminder

Your account Cred Card - XXXX is currently past due. You're required to pay the total minimum payment due by the payment due date. Doing so will help resolve your past due status and avoid further collection efforts on this account. The balance may not reflect recent transactions or pending payments that have not yet posted to your account.

New Balance Total: $554.89
Current Payment Due: $48.00
Amount Past Due: $76.00
Total Minimum Payment Due: $124.00
Payment Due Date: 04/01/2014

Can you make the total minimum payment due by 04/01/2014?
○ Yes   ○ No

Going forward, will you be able to meet payment obligations?
○ Yes   ○ No or not sure

---

Talk to a Specialist — 856
Chat online now

▼ Communication Center
✉ Message center
🔔 Alerts
ⓔ e-Bills New
▭ Statements and Documents 🔒 Secure Area   Locations | Contact us | Privacy & Security | Online Banking Service Agreement | En Español | Sign off

*FIG. 2B*

- Your credit card or credit account(s) is past due. Please pay the Total Minimum Payment Due to bring your account up to date.
- If you are unable to pay now, we may have options to assist you. For more details, please click here.

Reminder

260

Bank Online Banking

Profile & Settings | Sign Off
Search

| Accounts | Bill Pay | Transfers | Cash Back Deals | Tools & Investing | Open an Account | Help & Support |

Customer Assistance: Past Due Payment Reminder

Your account Cred Card - XXXX is currently past due. You're required to pay the total minimum payment due by the payment due date. Doing so will help resolve your past due status and avoid further collection efforts on this account. The balance may not reflect recent transactions or pending payments that have not yet posted to your account.

New Balance Total: $554.89
Current Payment Due: $48.00
Amount Past Due: $76.00
Total Minimum Payment Due: $124.00
Payment Due Date: 04/01/2014

Can you make the total minimum payment due by 04/01/2014?
○ Yes  ○ No

Going forward, will you be able to meet payment obligations?
○ Yes  ○ No or not sure

850

What is your reason for not making a payment?

| I am experiencing financial difficulty ▸ |

Select an option
I am experiencing financial difficulty
I already made a payment via phone
I already mailed a payment
I am already receiving credit protection/credit insurance benefits
I already recently accepted an agreement over the phone
I don't have time right now
I don't have my check book with me
Other

852

[ Continue.... ]

854

— Communication Center —
📩 Message center
🔔 Alerts
ⓔ e-Bills New
📄 Statements and Documents

[🗨 Talk to a Specialist
Chat online now]  ← 856

PROACTIVE CHAT SESSION

Bank System>> Would you like to speak to a customer service agent regarding a payment that you mailed?

User>> _

Name: _____    Customer ID: _____    Application ID: XXXX

Bank Product:
| | |
|---|---|
| Mortgage | [X] |
| Car Loan | ☐ |
| Boat Loan | ☐ |
| Credit Card | ☐ |
| Line of Credit | ☐ |

Monetary Amount: $ _____

Financial Documents

[X] Pay Stub 1          [X] W-2 Form

☐ Pay Stub 2           [X] Tax Return

☐ Rent Payment Check   [X] Investment Statement

Bank Online Banking

| Accounts | Bill Pay 🔍 | Transfers | Cash Back Deals | Tools & Investing | Open an Account | Help & Support |

Profile & Settings | Sign Off
Search 🔍

Customer Assistance: Transaction History

— 1252

| Date | Transaction Type | Notes |
|------|------------------|-------|
| 1/1/2014 | Promise to Pay | User agreed to pay $500 on 2/1/2014 and 3/1/2014 |
| 1/15/2014 | Communication | User communicated with Bank via online Chat |
| 1/30/2014 | Communication | User communicated with Bank via phone and online chat |
| 2/1/2014 | Payment | User paid $500 |

🧑 Talk to a Specialist
Chat online now

▼ Communication Center
- ✉ Message center
- 🔔 Alerts
- ○ e-Bills New
- 📄 Statements and Documents
- 📋 Transaction History 1250
1254

DISPLAY WINDOW

Loading image pushed by service agent. Please wait...

1256

CHAT SESSION — 1258

User>> I would like to see the full terms of my agreement of 1/1/2014.

Bank System>> Sure. I will push that onto your screen so that we can discuss any questions that you may have.

*FIG. 12B*

DYNAMICALLY MODIFYING AN APPLICATION QUESTIONNAIRE

TECHNICAL FIELD OF THE INVENTION

This invention relates generally to modifying an application, and more particularly to a system for dynamically modifying an application questionnaire.

BACKGROUND

Financial institutions often issue loans to their customers in the form of mortgages, installment loans, credit lines, credit card accounts, and other accounts whereby the customer incurs a debt in favor of the financial institution. In some cases, a customer might not repay the debt in accordance with the terms and conditions of the loan. For example, the customer might not make a payment by the due date. Missing a payment may be indicative of the customer's inability or difficulty in meeting loan obligations and may present financial risk to the financial institution in the event the customer is unable to satisfy the outstanding loan balance. To mitigate this risk, representatives of the financial institution may manually contact the customer (e.g., via telephone, letter, e-mail, etc.) to offer assistance to the customer in paying all or part of past-due balances or installments of a loan account. In some instances, the customer may initiate contact with the financial institution to seek such assistance. Such assistance may be an offer for credit counseling, an offer for an alternative payment plan for the loan, or other suitable assistance.

SUMMARY

In some embodiments, a system calculates a user risk score, and determines a first subset of questions using the user risk score and type of user device. The system communicates and receives answers to the first subset of questions. The system determines a second subset of questions based on the answers to the first subset of questions. The system communicates and receives answers to the second subset of questions. The system determines whether the answers to the first subset of questions are accurate. If the verification indicates that the answer to one or more of the first subset of questions is not accurate, the system determines a third subset of questions. The system communicates and receives answers to the third subset of questions. The system determines a plurality of repayment plans based on the user risk score and the answers to the first, second, and third subset of questions.

Certain embodiments of the present disclosure may provide one or more technical advantages. A technical advantage of one embodiment is that it reduces the amount of network resources used by lessening the amount of questions presented to a user. Another technical advantage of one embodiment is that it increases the efficiency of determining a repayment plan for the user. Yet another technical advantage is that it leads to receiving more accurate answers by determining the subset questions to ask and inaccuracies in any answers received. One or more other technical advantages may be readily apparent to those skilled in the art from the figures, descriptions, and claims included herein.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 2B illustrates an example alert format, in accordance with certain embodiments;

FIG. 8B illustrates an example embodiment of a graphical user interface of a user device that presents a chat session proactively to a user interacting with a network accessible application, in accordance with certain embodiments.

FIG. 10A illustrates an example of a bank application, in accordance with certain embodiments;

FIG. 12B illustrates an example embodiment of a GUI that provides information associated with a user's transaction history to the user via a graphical user interface displayed on a user device for a bank enterprise, in accordance with certain embodiments.

DETAILED DESCRIPTION OF THE DRAWINGS

A financial institution may offer assistance to customers with respect to the repayment of loans. For example, if a customer is having difficulty in meeting loan obligations, the financial institution may offer credit counseling, an alternative payment plan for the loan, coordination of a promise to pay, or other suitable assistance. Particular embodiments may facilitate providing such assistance to customers. Embodiments of the present disclosure and its advantages are best understood by referring to FIGS. 1 through 12B of the drawings, like numerals being used for like and corresponding parts of the various drawings.

Figure 1:
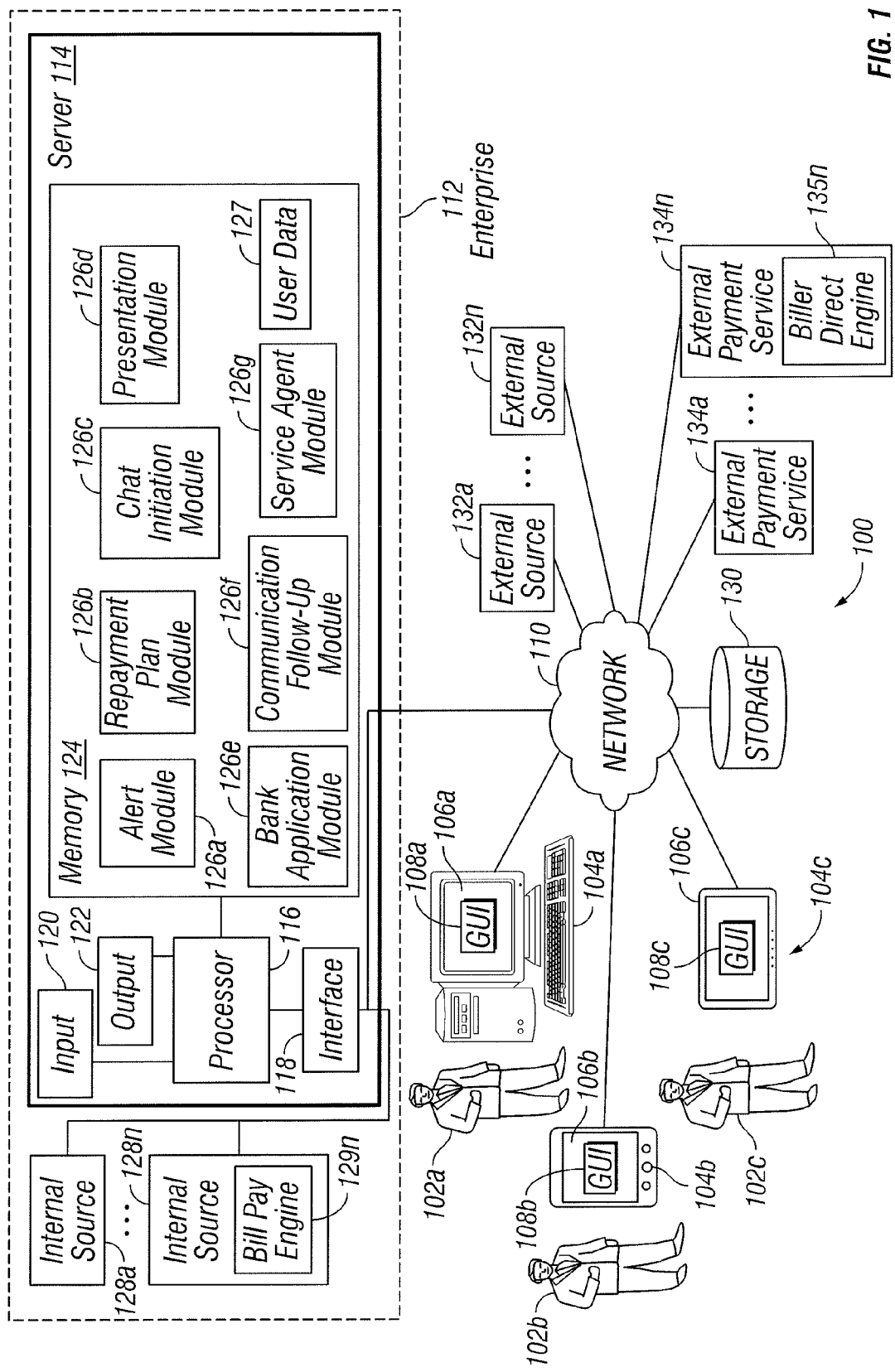
FIG. 1 illustrates an example block diagram of a customer assistance system, in accordance with certain embodiments.

FIG. 1 illustrates an example block diagram of a system 100 according to particular embodiments. System 100 may include one or more user devices 104, servers 114, internal sources 128, network storage devices 130, external sources 132, and/or external payment services 134 communicatively coupled by a network 110. In general, users 102 interact with user devices 104 to receive customer assistance from an enterprise 112, such as a financial institution. The financial institution provides financial services or financial products to customers and may be interchangeably referred to as a bank. Examples of financial products include a mortgage, car loan, boat loan, installment loan, credit line, credit card account, home equity line of credit, or other loan. Enterprise 112 comprises one or more servers 114 that facilitate providing customer assistance to users 102. Examples of customer assistance include an offer for credit counseling, an offer for an alternative repayment plan for a loan, coordination of a promise to pay, and assistance in applying for a loan.

User device 104 may refer to any device that enables user 102 to interact with server 114 associated with enterprise 112. Examples of user device 104 may include a computer, workstation, telephone, smartphone, Internet browser, electronic notebook, tablet computer, Personal Digital Assistant (PDA), pager, or any other suitable device (wireless, wireline, or otherwise), component, or element capable of receiving, processing, storing, and/or communicating information with other components of system 100. System 100 may comprise any number and combination of user devices 104 and may be used by any suitable users 102, such as customers of enterprise 112.

User device 104 includes any suitable user interface, such as a display 106, microphone, keyboard, or any other appropriate terminal equipment usable by a user 102. In some embodiments, user device 104 displays a graphical user interface (GUI) 108 on display 106. GUI 108 is generally operable to tailor and filter data entered by and presented to user 102. GUI 108 may provide user 102 with an efficient and user-friendly presentation of customer assistance information. GUI 108 may comprise a plurality of displays having interactive fields, pull-down lists, and buttons operated by user 102. GUI 108 may include multiple levels of abstraction including groupings and boundaries. It should be understood that the term GUI 108 may be used in the singular or in the plural to describe one or more GUIs 108 and each of the displays of a particular GUI 108.

In certain embodiments, network 110 may refer to any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

Server 114 may refer to any suitable combination of hardware and/or software implemented in one or more modules to process data and provide the described functions and operations. In some embodiments, the functions and operations described herein may be performed by a pool of servers 114. In some embodiments, server 114 may include, for example, a mainframe, server, host computer, workstation, web server, file server, a personal computer such as a laptop, or any other suitable device operable to process data. In some embodiments, server 114 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems.

In general, server 114 facilitates providing customer assistance to user 102 as described in more detail with respect to FIGS. 2A-12B below. Server 114 may comprise components of a customer assistance system, such as a processor 116, server memory 124, an interface 118, an input device 120, and an output device 122. Server memory 124 may refer to any suitable device capable of storing and facilitating retrieval of data and/or instructions. Examples of server memory 124 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or or any other volatile or non-volatile, non-transitory computer-readable memory devices that store one or more files, lists, tables, or other arrangements of information. Although FIG. 1 illustrates server memory 124 as internal to server 114, it should be understood that server memory 124 may be internal or external to server 114, depending on particular implementations. Also, server memory 124 may be separate from or integral to other memory devices to achieve any suitable arrangement of memory devices for use in system 100.

Server memory 124 is generally operable to store modules 126 and user data 127. Modules 126 may generally refer to logic, rules, algorithms, code, tables, and/or other suitable instructions for performing the described functions and operations. In general, modules 126 facilitate providing customer assistance to users 102 via user devices 104. In some embodiments, modules 126 may customize the assistance provided to a particular user 102 based on user data 127 associated with that user. Examples of user data 127 include user profile information (e.g., name, date of birth, social security number, etc.), account numbers for accounts that user 102 maintains with enterprise 112, the status of the accounts (e.g., payment due dates, payment history, missed payments, outstanding balances), terms of the loan (e.g., interest rate, schedule), terms of customer assistance offered to the customer in the past, or any other data associated with user 102.

Server 114 may obtain modules 126, user data 127, and other data or instructions utilized by server 114 from any suitable source. Examples of such sources include network storage device 130, internal sources 128, and external sources 132. Network storage device 130 may refer to any suitable device communicatively coupled to network 110 and capable of storing and facilitating retrieval of data and/or instructions. Examples of network storage device 130 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or or any other volatile or non-volatile, non-transitory computer-readable memory devices that store one or more files, lists, tables, or other arrangements of information. Network storage device 130 may store any data and/or instructions utilized by server 114.

Internal sources 128 may provide any suitable information to server 114. An internal source 128 may be associated with a line of business. As an example, internal source 128a may correspond to a credit card line of business, and user 102 may hold a credit card account with internal source 128a. Internal source 128a may provide server 114 with user data 127 related to the credit card account, such as outstanding balances and payment history, user profile information that the credit card line of business has on file for user 102, or other suitable information. As other examples, internal source 128b may correspond to a mortgage line of business, internal source 128c may correspond to a checking and savings line of business, internal source 128d may correspond to a brokerage business, and so on.

External sources 132 may provide any suitable information to server 114. An example of an external source 132 may be a credit reporting company that provides credit score information indicative of a level of risk associated with user 102. Another example of an external source 132 may be a customer contact service that maintains contact information, such as a residential address, a business address, phone numbers, fax numbers, and email addresses associated with user 102. Server 114 may receive information from external sources 132 and update user data 127 accordingly.

Server memory 124 communicatively couples to processor 116. Processor 116 is generally operable to execute modules 126 stored in server memory 124 to provide customer assistance according to the disclosure. Processor 116 may comprise any suitable combination of hardware and software implemented in one or more units to execute instructions and manipulate data to perform the described functions for servers 114. In some embodiments, processor 116 may include, for example, one or more computers, one or more central processing units (CPUs), one or more microprocessors, one or more applications, and/or other logic.

Modules 126 include alert module 126a, repayment plan module 126b, chat initiation module 126c, presentation module 126d, bank application module 126e, communication follow-up module 126f, service agent module 126g, and/or any other suitable modules 126 to facilitate the operations of server 114.

Alert module 126a may allow enterprise 112 to communicate alerts to its users 102, in accordance with certain embodiments. On execution by processor 116, alert module 126a may adapt the type and format of an alert to user 102. Examples of adapting the type and format of the alert are further described with FIGS. 2A-2C below. On execution by processor 116, alert module 126a may develop an automated alert notification plan for a user 102. Examples of developing an automated alert notification plan are further described with respect to FIG. 4 below.

Repayment plan module 126b may allow enterprise 112 to select, offer, or administer plans to user 102 for repaying a debt, in accordance with certain embodiments. As an example, repayment plan may include a promise-to-pay option where user 102 promises to repay at least a portion of the debt by a promised date. In some embodiments, the promise demonstrates user 102's intent to make a payment, but the promise itself does not transact the payment. To transact the promised payment, promise-to-pay information is communicated to external payment service 134 capable of initiating a funds transfer from a source financial account to a destination financial account specified by user 102. Communicating promise-to-pay information to external payment service 134 may be performed by processor 116 on execution of repayment plan module 126b. Examples of communicating promise-to-pay information are further described with respect to FIG. 3 below.

As another example, repayment plan module 126b may allow enterprise 112 to develop a hierarchy of repayment plans for user 102 to repay a debt, in accordance with certain embodiments. On execution by processor 116, repayment plan module 126b may determine a loan past due associated with a user, determine a plurality of repayment plans for the user, score the repayment plans, rank the payment plans based on the score, and offer the repayment plans to user 102 according to rank. Repayment plan module 126b may also receive counter-offer repayment plans from user 102 and determine whether to accept or reject the counter-offer repayment plans. Examples of developing a hierarchy of repayment plans are further described with respect to FIG. 5 below.

As another example, repayment plan module 126b may allow for integrating loans from various lines of business, in accordance with certain embodiments. In general, on execution by processor 116, repayment plan module 126b may receive loans from multiple lines of business, generate a single repayment plan for the loans, receive a payment from user 102 according to the repayment plan, and allocate the payment among the multiple lines of business. Examples of integrating loans from various lines of business are further described with respect to FIG. 6 below.

As another example, repayment plan module 126b may dynamically modify a loan repayment application, in accordance with certain embodiments. In general, on execution by processor 116, repayment plan module 126b selects repayment plan questions to ask user 102 (e.g., based on a user risk score or other information associated with user 102), receives user 102's responses to the repayment questions, and determines potential repayment plans based on the response. Examples of dynamically modifying a loan repayment application are further described with respect to FIG. 7 below.

Chat initiation module 126c may proactively initiate a chat session based on a user's interaction with network accessible content, in accordance with certain embodiments. On execution by processor 116, chat initiation module 126c may initiate a chat session proactively (e.g., without waiting for a request by the user to initiate the chat session) upon detection of certain chat session triggers. As stated previously, bank products may include mortgages, car loans, boat loans, installment loans, credit card accounts, etc. A bank product flow may be a sequence of steps associated with applying for and/or obtaining information for that product by a user. In certain embodiments, steps in a flow may be associated with one or more pages traversed at a website. The triggers may be associated with certain steps in a bank (or other) product flow, such that each step in a defined flow may have a certain set of proactive chat session triggers. Examples of proactively initiating a chat session with a user are further described with respect to FIGS. 8A-8B below.

Presentation module 126d may customize presentation of network accessible content according to a category of user device used to access the content, in accordance with certain embodiments. On execution by processor 116, presentation module 126d may operate to format content associated with a step in a product flow (e.g. a bank product flow) in accordance with the category of user device. For example, presentation module 126d may format a disclosure associated with accepting the terms of a repayment agreement with fewer words on a mobile phone device versus a desktop computer. In certain embodiments, other modules 126, such as alert module 126b, may reference presentation module 126d when communicating messages to users viewing content using a user device. As another example, bank application module 126e, discussed below, may present various steps for applying for a bank product in a different manner depending on the category of user device. Examples of customizing the display according to category of user device are further described with respect to FIG. 9 below.

Bank application module 126e may facilitate preparing an application for a mortgage or other bank product, in accordance with certain embodiments. On execution by processor 116, bank application module 126e may associate financial documents that user 102 submits via user device 104 with a corresponding bank application. In addition, bank application module 126e may provide instructions to user 102 describing steps for completing the bank application, financial documents to be submitted in the bank application, and so on. In some embodiments, certain instructions may be provided if user 102 does not complete the bank application within a pre-determined amount of time (which may indicate that the user needs assistance completing the bank application). Examples of preparing a bank application using a user device 104 are further described with respect to FIGS. 10A-10E below.

Communication follow-up module 126f may initiate follow-up communications to a user following one or more unsuccessful communication attempts, in accordance with certain embodiments. Communication follow-up module 126f may follow a scheme of trying different forms of communication to a user until a communication attempt is successful. In certain embodiments, an initial communication attempt may be made following a user's selection of a click-to-call selector on a webpage or native application that provides access to network accessible content. If the call to the user goes unanswered, communication follow-up module 126f may follow a scheme of communication attempts until the user is reached successfully. The type of communication attempted may depend on the category of user device used to make the initial request (e.g., whether a mobile phone versus a desktop/laptop made the click-to-call request) and/or the category of device that server 114 determines the user is currently using to access network accessible content associated with enterprise 112. Examples of initiating follow-up communication attempts to a user following an unsuccessful communication attempt are further described with respect to FIG. 11 below.

Service agent module 126g provides information associated with a user's transaction history to the user via a graphical user interface displayed on a user device while the user is communicating with a service agent in real-time, in accordance with certain embodiments. Service agent module 126g may help to facilitate discussion between a user and a service agent regarding items listed in the user's transaction history. During the real-time communication, the service agent may push certain images onto the display of the user device in order to enhance the discussion. The images may relate to one or more items in the user's transaction history. Additionally, certain restrictions may exist that prohibit display of certain categories of information associated with a user's transaction history, whereas a service agent may have access to any or all of the user's transaction history, where appropriate. Examples of providing information associated with a user's transaction history are further described with respect to FIGS. 12A and 12B below.

In some embodiments, processor 116 communicatively couples to communication interface 118 (I/F). Communication interface 118 may refer to any suitable device operable to receive input for server 114, send output from server 114, perform suitable processing of the input or output or both, communicate to other devices, or any combination of the preceding. Communication interface 118 may include appropriate hardware (e.g. modem, network interface card, etc.) and software, including protocol conversion and data processing capabilities, to communicate through network 110 or other communication system that allows server 114 to communicate to other devices. Communication interface 118 may include any suitable software operable to access data from or transmit data to various devices, such as user devices 104, internal sources 128, network storage device 130, external sources 132, and/or external payment services 134. Communication interface 118 may include one or more ports, conversion software, or both.

In some embodiments, input device 120 may refer to any suitable device operable to input, select, and/or manipulate various data and information. Input device 120 may include, for example, a keyboard, mouse, graphics tablet, joystick, light pen, microphone, scanner, or other suitable input device. Output device 122 may refer to any suitable device operable for displaying information to a user. Output device 122 may include, for example, a video display, a printer, a plotter, or other suitable output device. In some embodiments, input device 120 and output device 122 may allow an administrator to interact with server 114, for example, to manage server 114 and any of the data stored in server memory 124.

Modifications, additions, or omissions may be made to system 100 without departing from the scope of the invention. The components may be integrated or separated. Moreover, the operations may be performed by more, fewer, or other components. Additionally, the operations may be performed using any suitable logic comprising software, hardware, and/or other logic.

Figure 2A:
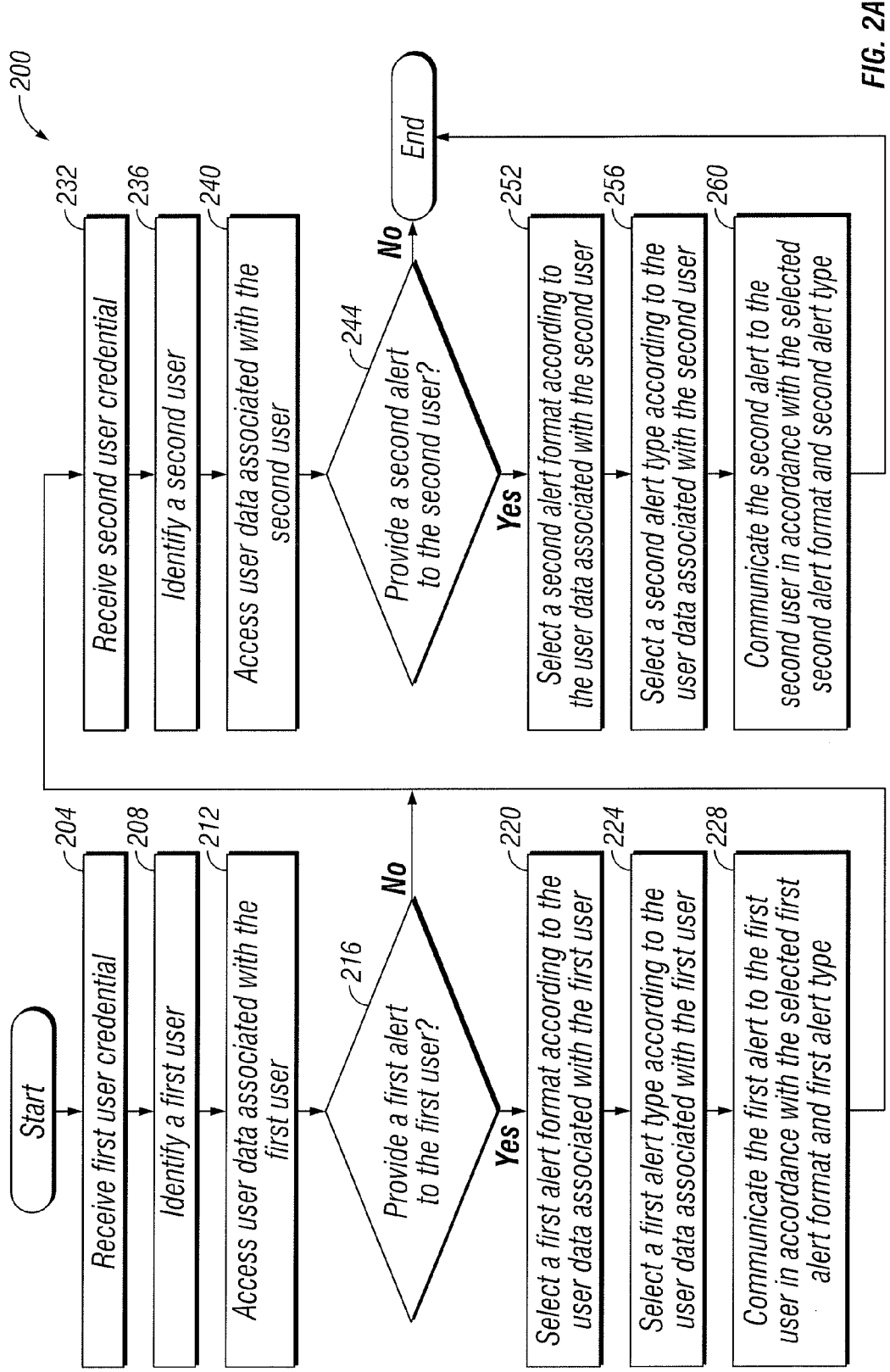
FIG. 2A illustrates an example method of adapting an alert notification according to user data, in accordance with certain embodiments.
Figure 2C:
FIG. 2C illustrates another example alert format, in accordance with certain embodiments.

FIGS. 2A-2C generally relate to alert module 126a. Alert module 126a may allow enterprise 112 to communicate alerts to its users 102. For example, enterprise 112 may be a bank where many customers hold one or more accounts with the bank. These customers may also be users 102 of system 100. It may be advantageous for both the bank and users 102 of system 100 to be able to communicate or receive alerts notifying a user 102 about information associated with user 102's account(s). For example, the bank may desire to communicate an alert notifying user 102 that an account associated with user 102 is past due.

Particular embodiments provide a way to adapt an alert notification according to user data 127. In some embodiments, system 100 may customize an alert notification according to user data 127, which may result in user 102 paying more attention to the alert. In some embodiments, tailoring the information conveyed to a particular user 102 according to user data 127 associated with user 102 may increase the effectiveness of the alert notification.

FIG. 2A is a flow chart illustrating an example method of adapting an alert notification according to user data, in accordance with certain embodiments.

At step 204, system 100 may receive a first user credential. For example, processor(s) 116 associated with enterprise 112 of system 100 may receive the first user credential via interface 118. The first user credential may be any suitable identifier of a first user 102a. As one example, first user credential may be a username and password associated with user 102a. In some embodiments, first user 102a may interact with user device 104 to enter the first user credential via a user interface associated with a website. As another example, the first user credential may be contained on a user device associated with first user 102a, such as user device 104 described above in relation to FIG. 1. The first user credential may be communicated from user device 104 to processor 116 through network 110.

At step 208, processor 116 identifies first user 102a. In some embodiments, first user 102a may be identified based on the first user credential received at step 204. At step 212, processor 116 accesses user data 127 associated with first user 102a. User data 127 may include any suitable information associated with first user 102a. In some embodiments, user data 127 associated with first user 102a may include information regarding accounts first user 102a maintains with an enterprise, such as enterprise 112 described above. As an example, user data 127 associated with first user 102a may include the status of accounts first user 102a maintains with enterprise 112, as well as whether any of those accounts are past due. In some embodiments, user data 127 may include payment history for first user 102a. In some embodiments, payment history may include information relating to payments made on time by first user 102a or whether first user 102a has missed payments when they became due. In some embodiments, the user information associated with first user 102a may include information relating to whether there are any pending actions that user 102a needs to be alerted to. In some embodiments, actions may include any suitable information. For example, actions may include notifications of missed payments or a reminder of an upcoming payment.

At step 216, processor 116 determines whether to provide a first alert to first user 102a. In some embodiments, the first alert may serve to notify first user 102a of an action by enterprise 112. As one example, enterprise 112 may be a bank, and first user 102a may have missed a payment due on a credit card associated with first user 102a. Under such circumstances, enterprise 112 may desire to notify first user 102a of the missed payment and provide user 102a with an opportunity to make the payment.

In some embodiments, processor 116 may determine not to provide an alert to first user 102a. As an example, if there is not currently an action associated with first user 102a, processor 116 may determine not to provide an alert to first user 102a. In response to a determination not to provide an alert to first user 102a, the method may proceed to step 232, described in more detail below. In some embodiments, processor 116 may determine to provide an alert to first user 102a. As an example, if user 102a has missed a payment due on a credit card, processor 116 may determine to provide an alert to first user 102a notifying them that their account is past-due. In response to a determination to provide an alert to first user 102a, the method may proceed to step 220.

As described above with respect to FIG. 1, system 100 may include alert module 126a stored in memory 124. In some embodiments, alert module 126a may be operable to perform any suitable functions for adapting an alert notification according to user data 127. As an example, processor 116 may execute alert module 126a to determine whether to provide a first alert to first user 102a. Processor 116 may also execute alert module 126a to select alert formats and alert types. In some embodiments, alert module 126a, upon execution by processor 116, may access user data 127 stored in memory 124. Alert module 126A may be adapted to carry out actions on user data 127 or use user data 127 to perform any suitable function or action. In some embodiments, alert module 126a may store information relating to alerts associated with one or more users 102. As an example, alert module 126a may store information relating to actions associated with a user 102. In some embodiments, information pertaining to actions associated with a user 102 may be stored in user data 127, or in any other suitable portion of system 100.

At step 220, processor 116 selects a first alert format according to user data 127 associated with first user 102a. In some embodiments, alert module 126a may contain one or more alert formats, and processor 116 may select a first alert format defined and/or stored within alert module 126a. In some embodiments, the one or more alert formats may provide different formats for conveying information to a user 102. As one example, an alert format may be a webpage providing detailed information about an action, such as the alert format illustrated in FIG. 2B. As another example, an alert format may be a non-intrusive alert that appears alongside other content or information that a user 102 is accessing, such as the example alert format illustrated in FIG. 2C and described in more detail below.

Processor 116 may select an alert format based on any suitable criteria. In some embodiments, an alert format is selected according to user data 127 associated with first user 102a. As one example, one of the one or more alert formats may be associated with user data 127 indicating a history of missed payments, while another alert format may be associated with user data 127 indicating no history of missed payments. If processor 116 determines to send an alert notification to a user 102, and user data 127 associated with user 102 indicates that user 102 has a history of missed payments, processor 116 may select the alert format associated with a history of missed payments. As another example, user data 127 associated with user 102 may include information relating to classifications of user 102 or accounts associated with user 102. For example, user 102 may be classified as a preferred user, in which case processor 116 may select a particular alert format associated with preferred users. As another example, an account associated with user 102 may be a preferred account, in which case processor 116 may select an alert format associated with preferred accounts. In some embodiments, processor 116 may select a particular alert type based on other suitable information, such as the amount of time that has passed since a payment became due on an account associated with user 102, or the amount due for an account associated with user 102.

At step 224, processor 116 selects a first alert type according to user data 127 associated with first user 102a. In some embodiments, alert module 126a may contain one or more alert types, and processor 116 may select a first alert type contained within alert module 126a. In some embodiments, the one or more alert types may be different forms of communicating with user 102a. The one or more alert types may be any suitable form of communicating with user 102a. For example, the one or more alert types may include a chat room (such as a pro-active chat room), a phone call, an e-mail, a text message, or a webpage. In some embodiments, the selected alert type may be based on an alert type preference associated with first user 102a. In some embodiments, the alert type preference may be included in user data 127 associated with a user 102. In some embodiments, the alert type preference may be stored in alert module 126a. In some embodiments, processor 116 may select the first alert type according to a user preference associated with first user 102a. In some embodiments, processor 116 may select the first alert type according to default settings defined and/or stored in alert module 126a.

At step 228, processor 116 communicates the first alert to first user 102a in accordance with the selected first alert format and first alert type. For example, processor 116 may communicate the first alert to interface 118 for delivery through network 110 to a first user device 104a associated with first user 102a. First user device 104a receives the first alert and presents the first alert to first user 102a using display 106a or other user interface.

At step 232, processor 116 receives a second user credential. The second user credential may be any suitable identifier of a second user 102b. In some embodiments, the second user credential may be similar to first user credential described above. At step 236, the system may identify second user 102b in a manner similar to that described above with regard to step 208.

At step 240, processor 116 may access user data 127 associated with second user 102b. The user data 127 associated with second user 102b may contain similar information as described above with respect to user data 127 associated with first user 102a. As one example, user data 127 associated with second user 102b may include information regarding accounts that second user 102b maintains with enterprise 112. User data 127 associated with second user 102b may also include information relating to whether any of those accounts are past due.

At step 244, processor 116 determines whether to provide a second alert to second user 102b. In some embodiments, the second alert may serve to notify user 102b of an action by enterprise 112. As one example, enterprise 112 may be a bank and second user 102b may have missed a payment due on a credit card associated with second user 102b. Under such circumstances, enterprise 112 may notify second user 102b of the missed payment and provide them with an opportunity to make the payment.

In some embodiments, processor 116 may determine not to provide an alert to second user 102b. As an example, if there is not currently an action associated with second user 102b, the system may determine not to provide an alert to second user 102b. In response to a determination not to provide an alert to first user 102b, the method may end. In some embodiments, the system may determine to provide an alert to second user 102b. As an example, if user 102b has missed a payment due on a credit card account, the system may determine to provide an alert to second user 102b notifying them that their account is past-due. In response to a determination to provide an alert to second user 102b, the method may proceed to step 252.

At step 252, processor 116 selects a second alert format according to user data 127 associated with second user 102b. Processor 116 may select the second alert type in a manner similar to that described above with respect to step 220. In some embodiments, processor 116 may select the second alert format from the one or more alert formats defined and/or stored in alert module 126a. According to the user data 127 associated with second user 102b, processor 116 may select a second alert format. In some embodiments, the second alert format selected for user 102b may be different from the first alert format selected for user 102a. In some other embodiments, the second alert format selected for user 102b may be the same as the first alert format selected for user 102a.

At step 256, processor 116 selects a second alert type according to user data 127 associated with second user 102b. As described above with respect to step 224, alert module 126a may contain one or more alert types. The second alert type may be selected in a similar manner to that described above with respect to step 224. In some embodiments, the second alert type may be selected based on a user preference associated with second user 102b.

At step 260, processor 116 communicates the second alert to second user 102b in accordance with the selected alert format and second alert type. For example, processor 116 may communicate the second alert to interface 118 for delivery through network 110 to a second user device 104b associated with first user 102b. Second user device 104b receives the second alert and presents the second alert to second user 102b using display 106b or other user interface. Then the method may end.

In operation, enterprise 112 may be a financial institution, such as a bank. System 100 may receive a first user credential from first user 102a. For example, user 102a may enter a username and password at the financial institution's website. System 100 may identify user 102a using the received first user credential, and access user data 127 associated with first user 102a. In some embodiments, user data 127 associated with first user 102a may indicate that an account associated with user 102a is past due, and that first user 102a has a history of missed payments. System 100 may then determine, using one or more processors, to provide a first alert to first user 102a. The first alert may be designed to notify first user 102a of a first action associated with first user 102a.

In response to the determination to provide the alert to first user 102a, system 100 may select, according to the user data 127 associated with first user 102a, a first alert format from one or more alert formats stored in alert module 126a. The selected first alert format may be associated with a history of missed payments, and in some embodiments may convey detailed information about the past due account. The first alert format may provide any suitable information about the past due account associated with user 102a. For example, the first alert format may provide information relating to the account balance, the current payment due, the amount past due, the total minimum payment due, or the payment due date.

In response to the determination to provide the alert to first user 102a, system 100 may select, according to the user data 127 associated with first user 102a, a first alert type from one or more alert types stored in alert module 126a. In some embodiments, the first alert type may be a manner of communicating the first alert to user 102a. In such an embodiment, the first alert type may be any suitable manner of communicating the first alert to user 102a. For example, the first alert type may be a webpage, a text message, a phone call, or e-mail, or a chat room. In some embodiments, the alert type may be associated with an alert type preference included in user data 127 associated with first user 102a, or stored in alert module 126a or any other suitable location within system 100. For example, user 102a may have an alert type preference for receiving alerts by e-mail, and system 100 may select email as the selected first alert type based at least in part on the alert type preference for user 102a.

System 100 may then communicate the alert to first user 102a in accordance with the selected first alert format and first alert type. For example, system 100 may communicate the first alert to first user 102a using the alert format associated with a history of missed payments and communicate that first alert format to first user 102a using an e-mail message alert type, according to the alert type preference associated with user 102a.

System 100 may receive a second user credential from second user 102*b*. For example, second user 102*b* may enter a username and password at the bank's website. System 100 may identify second user 102*b* using the received credential, and access user data 127 associated with second user 102*b*. In some embodiments, user data 127 associated with second user 102*b* may indicate that an account associated with second user 102*b* is past due, and that user 102*b* does not have a history of missed payments. System 100 may then determine, using one or more processors, to provide a second alert to second user 102*b*. The second alert may be designed to notify second user 102*b* of a second action associated with user 102*b*. The second action associated with second user 102*b* may be the same type of action as the first action associated with first user 102*a* (e.g., a notification of missed payment).

In response to the determination to provide the second alert to second user 102*b*, system 100 may select, according to user data 127 associated with second user 102*b*, a second alert format from the one or more alert formats defined and/or stored in alert module 126*a*. The selected second alert format may be associated with no history of missed payments, and may convey less detail about the past due account as compared to the first alert format associated with a history of missed payments described above. Instead of providing detailed account information, the second alert format associated with no history of missed payments may provide a simple reminder to second user 102*b* that a payment is due on an account associated with second user 102*b*.

In response to the determination to provide the second alert to second user 102*b*, system 100 may select, according to user data 127 associated with second user 102*b*, a second alert type from the one or more alert types defined and/or stored in alert module 126*a*. As described above, the second alert type may be any suitable manner of communicating the second alert to second user 102*b*. As described above, the alert type may selected according to an alert type preference associated with user 102*b* and stored in user data 127 or any other suitable location within system 100. For example, user 102*b* may have an alert type preference for receiving alerts by text message, and system 100 may select text message as the selected second alert type.

System 100 may communicate the second alert to second user 102*b* in accordance with the selected second alert format and second alert type. For example, system 100 may communicate the second alert to second user 102*b* using the alert format associated with no history of missed payments and communicate that second alert format to second user 102*b* using a text message alert type, according to the alert type preference associated with user 102*b*.

Thus, even where a bank action associated with first user 102*a* and second user 102*b* is be the same (e.g., a notification of missed payment), the first and second alerts notifying first user 102*a* and first user 102*b*, respectively, may be customized according to user data 127 associated with first user 102*a* and second user 102*b*. The first and second alerts may be communicated using different alert formats and different alert types. In some embodiments, this may advantageously allow an alert notifying a user 102 of a bank action to be customized based on user data 127 associated with a particular user 102.

Any suitable modifications may be made to the method described above. In alternative embodiments, system 100 may receive a different kind of user credential for first user 102*a* and first user 102*b*. For example, first user 102*a* may provide a username and password, while second user 102*b* may have a user credential associated with a particular user device 104 that system 100 may recognize, such as a cookie stored by an internet browser. In some embodiments, system 100 may not receive a user credential and may identify a particular user 102 by other means. For example, alert module 126*a* may store information regarding particular actions associated with one or more users 102, and system 100 may identify a user based at least in part on that information. Additionally, in certain embodiments the alert type may not be selected based on an alert type preference associated with a user 102. In some embodiments, system 100 may select an alert type from alert module 126*a* based on default settings or any other suitable approach. In some embodiments, user data 127 associated with first user 102*a* and second user 102*b* may be similar, and the same alert format may be used for notifying first user 102*a* and second user 102*b* of a first and second action associated with first user 102*a* and second user 102*b*, respectively.

FIG. 2B illustrates an example alert format, in accordance with certain embodiments. As described above, system 100 may select an alert format from among one or more alert formats stored in alert module 126*a*. In some embodiments, the one or more alert formats may be selected according to user data 127 associated with a particular user 102. In some embodiments, and as illustrated in FIG. 2B, an alert format may be associated with user data 127 indicating a history of missed payments. In such an embodiment, the alert format may convey information 256 about a past due account. Information 256 may provide any suitable details about a past due account. For example, information 256 may include information relating to the account balance, the current payment due, the amount past due, the total minimum payment due, or the payment due date.

FIG. 2C illustrates another example alert format, in accordance with certain embodiments. As described above, the one or more alert formats may be selected according to user data 127 associated with a particular user 102. In some embodiments, and as illustrated in FIG. 2C, an alert format may be associated with user data 127 indicating no history of missed payments. In such an embodiment, the alert format may convey little detail about a past due account as compared to the alert format associated with a history of missed payments described above with respect to FIG. 2B. Instead of providing detailed information, the alert format illustrated in FIG. 2C may provide a simple reminder 260 reminding user 102 that a payment is due on an account associated with user 102.

Although FIGS. 2B and 2C illustrate example alert formats, the present disclosure contemplates the use of any suitable number of alert formats having any suitable characteristics. In some embodiments, the information conveyed by the one or more alert formats may be adapted to the particular action they are associated with. In some embodiments, alert formats may vary based at least in part on the selected alert type. In some embodiments, the one or more alert formats may be divided into subclasses. For example, a particular alert format, such as the first alert format described above with respect to FIG. 1, may have subclasses of alert formats associated with the alert type selected. Although the information contained in such an alert format (such as detailed information 256 described above with respect to first alert type) may be the same, the appearance of the alert format may vary depending on the alert type selected from among the one or more alert types. For example, the appearance of an alert format communicated in accordance with a selected text message alert type may be different from a selected email alert type, though they may contain the same information. In some embodiments, this may advantageously allow the bank to adapt alerts to various user devices 104.

As described with respect to FIG. 1 above, system 100 offers various types of customer assistance to users 102. As an example, customer assistance may assist a user 102 that has missed one or more payments due on a credit card and/or other financial account. In some embodiments, the customer assistance allows user 102 to configure a promise to pay. For example, user 102 may configure a promise to make a payment in the future if user 102 cannot make a payment at present. The promise to pay may include any suitable information, such as a promised amount, a promised date for the payment, the financial account from which the payment is to be made, the financial account to which the payment is to be made, etc.

In some embodiments, promise-to-pay information may be communicated to an external payment service to facilitate making the promised payment on the promised date. Examples of communicating promise-to-pay information are described in more detail with respect to FIG. 3 below. In some embodiments, alerts may be configured to remind user 102 to make a payment that user 102 promised to pay. Examples of promise-to-pay alerts are described in more detail with respect to FIG. 4 below.

Figure 3:
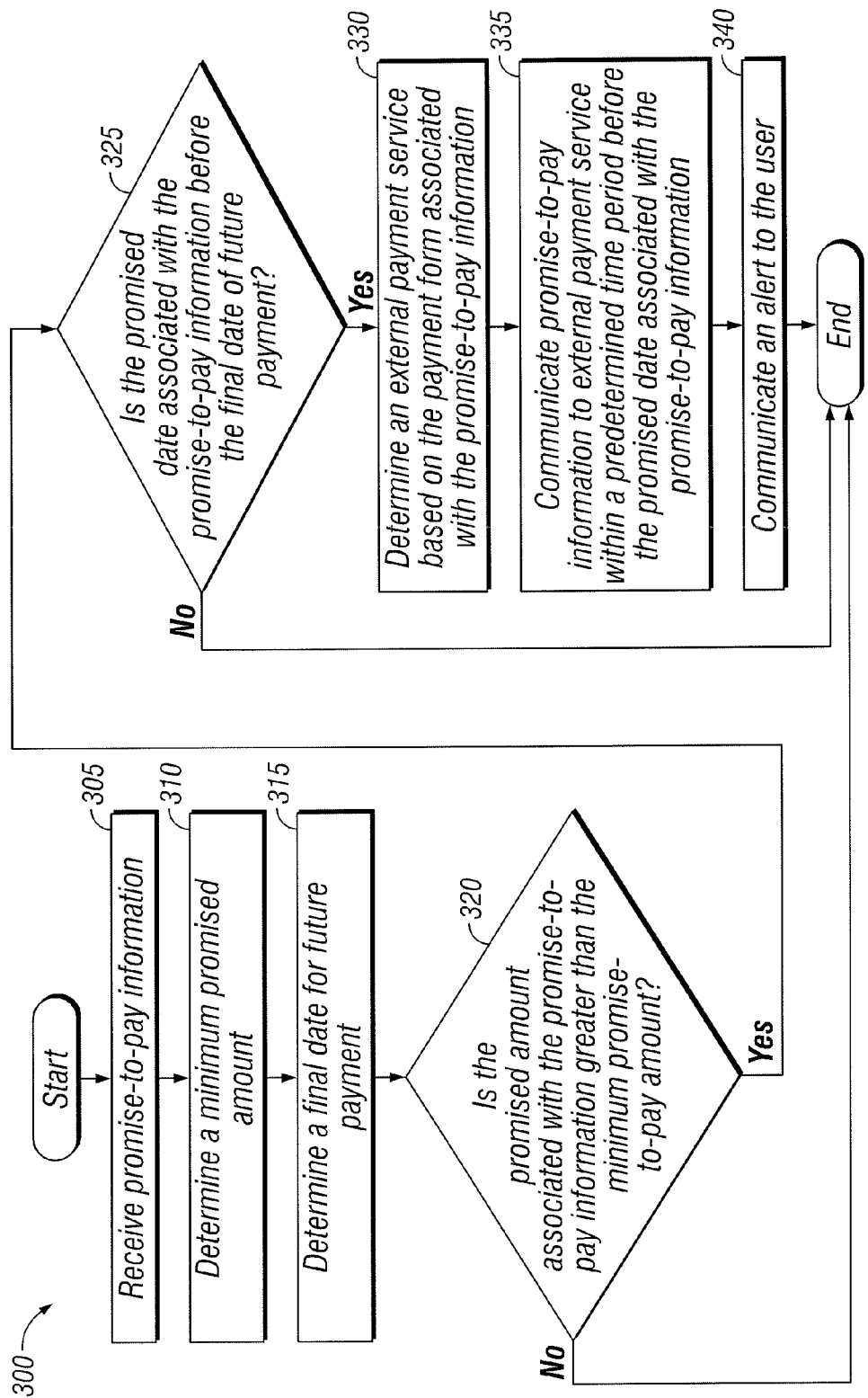
FIG. 3 illustrates an example method for communicating promise-to-pay information to a payment service, in accordance with certain embodiments.

FIG. 3 illustrates an example method for communicating promise-to-pay information to external payment service 134. At step 305, interface 118 receives promise-to-pay information from user 102. In certain embodiments, repayment plan module 126b receives the promise to pay from user 102 and extracts the promise-to-pay information from the received promise to pay. The promise-to-pay information may comprise a promised amount, promised date, payment form, user information, or other details associated with the promise-to-pay agreement.

At step 310, processor 116 determines a minimum promise-to-pay amount. The minimum promise-to-pay amount indicates the minimum amount that a user may indicate as the promised amount. The minimum payment amount may be calculated by repayment plan module 126b based on any suitable criteria, including without limitation the past due amount, the due date of the past due amount, user payment history, credit risk, and/or other factors. At step 315, processor 116 determines a final date of future payment. The final date for future payment indicates the last date that a user may schedule a promise to pay. The final date for future payment may be calculated by repayment plan module 126b based on any suitable criteria, including without limitation the past due amount, the due date of the past due amount, user payment history, credit risk, and/or other factors.

At step 320, processor 116 determines if the promised amount associated with the promise-to-pay information is greater than the minimum promise-to-pay amount. If the promised amount is less than the minimum promise-to-pay amount, processor 116 may cancel the promise to pay and/or prompt user 102 to increase the promised amount. If the user changes the promised amount, the method may return to step 305 where processor 116 receives the promise-to-pay information comprising the new promised amount. If at step 320 the promised amount is greater than the minimum promise-to-pay amount, the method proceeds to step 325.

At step 325, processor 116 determines if the promised date of the payment is before the final date of future payment. If the promised date is after the final date, processor 116 may cancel the promise to pay and/or prompt user 102 to move up the promised date. If the user changes the promised date, the method may return to step 305 where processor 116 receives the changed promise-to-pay information with the new promised date. If at step 325 the promised date is before the final date of future payment, the method proceeds to step 330.

At step 330, processor 116 determines external payment service 134. External payment services 134 may include payment services external to enterprise 112's customer assistance system (but internal to enterprise 112) and/or payment services external to enterprise 112. A payment service external to enterprise 112's customer assistance system (but internal to enterprise 112) may comprise a bill pay engine 129 that transfers funds between accounts that various lines of business of enterprise 112 provide to user 102. For example, money could be moved from user 102's checking account or savings account (an account provided by a first line of business) in order to make a payment in user 102's loan account (an account provided by a second line of business). Different lines of business could use different bill pay engines 129 or different types of payment engines. As an example, a credit card line of business might use a bill page engine 129 and a checking line of business might use a move money engine or other engine to transfer funds from a checking account.

A payment service external to enterprise 112 may comprise a biller direct engine 135 to facilitate payments from an account that user 102 maintains with a different bank or other third party. For example, biller direct engine 135 may bill a credit card account that a different bank provides user 102 in order to make a payment in user 102's loan account (an account provided by enterprise 112). Different third parties could use different biller direct engines 135 or different types of payment engines. Processor 116 may tailor the content and format of the promise-to-pay information that it communicates based on the engine receiving the information.

Processor 116 determines external payment service 134 based on the payment form associated with the promise-to-pay information. The payment form may be determined based on the account type from which the payment is to be made (e.g., savings, checking, credit card, etc.), the entity that provides user 102 with the account (e.g., another line of business within enterprise 112 or a third party), and/or other suitable information. In certain embodiments, processor 116 correlates one or more payment forms to one or more external payment services 134. For example, payments from a credit card account that user 102 holds with enterprise 112 may correlate to one external payment service 134, payments from a checking account that user 102 holds with enterprise 112 may correlate to another external payment service 134, and payments from a credit card account that user 102 holds with a different bank may correlate to yet another external payment service 134.

At step 335, interface 118 communicates the promise-to-pay information to external payment service 134. In certain embodiments, each payment engine and/or external payment service 134 may require a specific message format from repayment plan module 126b. Repayment plan module 126B may translate the promise-to-pay information into the specific message format of the determined external payment service 134. Repayment plan module 126B may also encrypt the message using encryption methods before communicating the promise-to-pay information to external payment service 134. In some embodiments, the promise-to-pay information may be communicated within a predetermined time period before the promised date associated with the promise-to-pay information as further described below.

At step 340, repayment plan module 126b communicates an alert to user 102 via user device 104. The alert indicates the promise-to-pay information and external payment service 134. The alert may inform user 102 that the payment is going to be made or inform user 102 that the payment has been made. The alert may ask user 102 to confirm that user 102 wishes to make the payment or may remind user 102 to schedule a payment with external payment service 134. In embodiments where user schedules a payment corresponding to the promise-to-pay, external payment service 134 may pre-populate certain fields of the payment scheduler using corresponding promise-to-pay information received in step 335. For example, the payment amount may be pre-populated with the promised amount and the payment date may be pre-populated with the promised date. The method then ends.

Modifications, additions, or omissions may be made to the method depicted in FIG. 3. The method may include more, fewer, or other steps. For example, processor 116 may determine a minimum promise-to-pay amount but not determine a final date for future payment. As another example, steps may be performed in parallel or in any suitable order. While discussed as processor 116 and interface 118 performing the steps, any suitable component of system 100 may perform one or more steps of the method.

In an exemplary embodiment of operation, repayment plan module 126b, located in memory 124 or any suitable area external to server 114, may facilitate processes that communicate promise-to-pay information to external payment service 134. For example, processor 116 may execute the logic associated with repayment plan module 126b to perform the method and functionality described with respect to FIG. 1 and FIG. 3.

Interface 118 may receive a promise-to-pay agreement associated with a past due amount from user 102. In some embodiments, a promise to pay is an agreement from user 102 indicating a willingness (e.g., desire and/or financial ability) to pay a portion or all of a past due amount on a loan by a particular date in the future. For example, user 102 may fail to make a payment on a monthly payment for a loan. A loan is a debt provided by one entity to another entity (e.g., credit card amount, house mortgage, car mortgage, business loan, personal loan, or any other type of debt). In this scenario, user 102 may enter into a promise to pay in which the user promises to pay a certain percentage of the past due loan by a specific date.

Promise-to-pay information is information gathered from a user's agreement to a promise-to-pay agreement. In certain embodiments, interface 118 receives the promise to pay from user 102 and extracts the promise-to-pay information from the received promise to pay. The promise-to-pay information may comprise a promised amount, a promised date (the date on which the user promises to pay the promised amount), payment form, user data 127, or other details associated with the promise-to-pay agreement.

A promised amount is the monetary indication from user 102 that user 102 promises to pay. User 102 may enter the promised amount in either a currency specified by enterprise 112, a currency specified by the user, or a currency determined by the a location determined by enterprise 112 (e.g., based on the location of user device 104 associated with user 102 or based on the location where a financial account that enterprise 112 associates with user 102 is domiciled). In certain embodiments, processor 116 converts the entered currency from user 102 into a currency specified by either external payment service 134 or by the line of business associated with the past due amount.

The payment form indicates the form of payment that the user intends to use to pay the promised amount by the promised date. Examples of payment forms include money from a checking account, money from a savings account, cash, debit card, credit card, check, or any other type of payment that transfers money from one account to another account. The payment form may also comprise billing information (e.g., some or all of information required for external payment service 134 to process the promised amount using the payment form, such as a billing address, a security code, or other information).

User data 127 may be any information associated with user 102. Repayment module 126B may receive information associated with user 102 from various avenues. Repayment module 126B may receive user data 127 from a user profile previously entered by user 102, extracted information from a document associated with user 102, user information gathered from various lines of businesses (e.g., internal sources 128), information retrieved from network storage 130, information gathered from external sources 132, etc. Examples of user data 127 include but are not limited to name, address, telephone number, age, social security number, residence address, demographic information, or other information that may uniquely identify the user. Demographic information includes quantifiable statistics of user 102, such as deviation from median household income, average income of similar employment positions, or any other indicators that provides statistics and information on user 102.

In certain embodiments, user 102 may enter a plurality of promises to pay at one time. For example, user 102 may indicate that he or she promises to pay a first amount by a first date and a second amount by a second date. In the scenario, the promise-to-pay information may comprise a plurality of information relating to the plurality of promises to pay, such as first and second promised amounts, first and second promised dates, first and second payment forms, or any other information relating to a plurality of promises to pay.

In another exemplary embodiment, processor 116 determines a minimum promise-to-pay amount and a final date for future payment. The minimum promise-to-pay amount indicates the minimum amount that a user may indicate as the promised amount, and the final date for future payment indicates the last date that a user may schedule a promise to pay. The minimum payment amount may be calculated by processor 116 based on any suitable criteria, including without limitation the past due amount, the due date of the past due amount, a user payment history, credit risk, user risk score, and/or other factors. Similar to the minimum payment amount, the final date for future payment may be calculated by processor 116 based on any suitable criteria, including without limitation the past due amount, the due date of the past due amount, a user payment history, credit risk, and/or other factors. The user risk score indicates the ability of the user to repay the loan past due. The user risk score may be calculated by processor 116 based on any suitable criteria, including without limitation the user payment history, the loan past due, user information, credit risk, demographic information, and/or other factors. Processor 116 may update and/or re-calculate user risk score with newly received information. The user payment history indicates past payments on loans associated with user 102.

Processor 116 may determine that the promised amount indicated by the user is greater than or equal to the determined minimum promise-to-pay amount and/or that the promised date is before or on the final date for future payment. In certain embodiments wherein the user indicates multiple promises to pay, processor 116 may compare the combination of promised amounts associated with the multiple promises to pay with the minimum promise-to-pay. Similarly, processor 116 may determine the earliest promised date and compare that date with the final date for future payment (e.g., if user 102 only needs to make at least one payment before the final date for future payment). Or, processor may compare each promised date with the final date for future payment (e.g., if user 102 needs to make all of the promised payments by the final date for future payment).

If processor 116 determines that the promised amount indicated by the user is greater than or equal to the determined minimum promise-to-pay amount and/or that the associated promised date is before or on the final date for future payment, the processor 116 may determine external payment service 134 based on the payment form associated with the promise-to-pay information. External payment service 134 is a payment service that processes the promise-to-pay amount. External payment service 134 can be external to enterprise 112 or external to enterprise 112's customer assistance system, and system 100 can include one or both types of external payment service 134. In certain embodiments, processor 116 correlates one or more payment forms to one or more external payment services 134.

In some embodiments, interface 118 may communicate the promise-to-pay information to external payment service 134 in connection with user 102 setting up the promise to pay. So, at approximately the time that user 102 configures the promise to pay, user 102 can also schedule a corresponding payment with external service 134. Interface 118 communicates the promised amount, promised date, and/or other promise-to-pay information from the customer assistance system to external payment service 134 so that external payment service 134 can pre-populate any corresponding fields in the payment scheduler.

In other embodiments, interface 118 communicates the promise-to-pay information to external payment service 134 according to a predetermined time period. The predetermined time period is configured such that on or before the promised date, interface 118 communicates the promise-to-pay information to external payment service 134. The predetermined time period is specified by enterprise 112, user 102, or any other person or entity. The predetermined time period may be fixed or variable. For example, the predetermined time period may be configured such that the promise-to-pay information is communicated on the $n^{th}$ day prior to the promised date, or the predetermined time period may be configured such that the promise-to-pay information is communicated anytime within n days prior to the promised date. The predetermined time period may vary depending on whether the external service 134 corresponds to another line of business of enterprise 112 or to a third party.

In some embodiments, communicating the promise-to-pay information may be subject to any suitable conditions, such as receiving confirmation from user 102 to proceed with the promise-to-pay or reviewing account information associated with user 102 (e.g., to ensure that user 102 still owes the payment and has not already made the payment through other avenues). Processor 116 may evaluate the conditions during the predetermined time period and communicate the promise-to-pay information to the appropriate external payment service 134 if the conditions are satisfied.

Each external payment service 134 may require a specific message format from interface 118. Processor 116 may translate the promise-to-pay information into the specific message format of the determined external payment service 134. Processor 116 may also encrypt the message using encryption methods before communicating the promise-to-pay information to external payment service 134.

In another embodiment, interface 118 may receive payment service information from external payment service 134 such that processor 116 may process the promise-to-pay amount. For example, interface 118 may receive a frame from external payment service 134 to display to user 102. The frame may include information necessary to process a promised amount by external payment service 134. The frame may be displayed in a webpage associated with enterprise 112, or in any another display method such that user 102 inputs information in the frame for external payment service 134 to process the promised amount. External payment service 134 may also provide an indication of a payment by user 102. For example, if user 102 initiates a payment directly through external payment service 134, external payment service 134 may provide an indication of the payment via interface 118 so that the promise-to-pay service does not initiate a payment for the amount that has already been paid. Repayment module 126B may update the promise to pay, promise-to-pay information, and/or the user information based on the indication of the payment by user 102.

In certain circumstances, it may be desirable to remind user 102 of the promise to perform via an alert. The alert may be a text message, an e-mail, a hyperlink, or any other form of communication to user 102 indicating the promise to pay. In certain embodiments, processor 116 sends the alert to user 102 via user device 104 and processor 116 waits to receive user 102's response to the alert before communicating the promise-to-pay information to external payment service 134.

Figure 4:
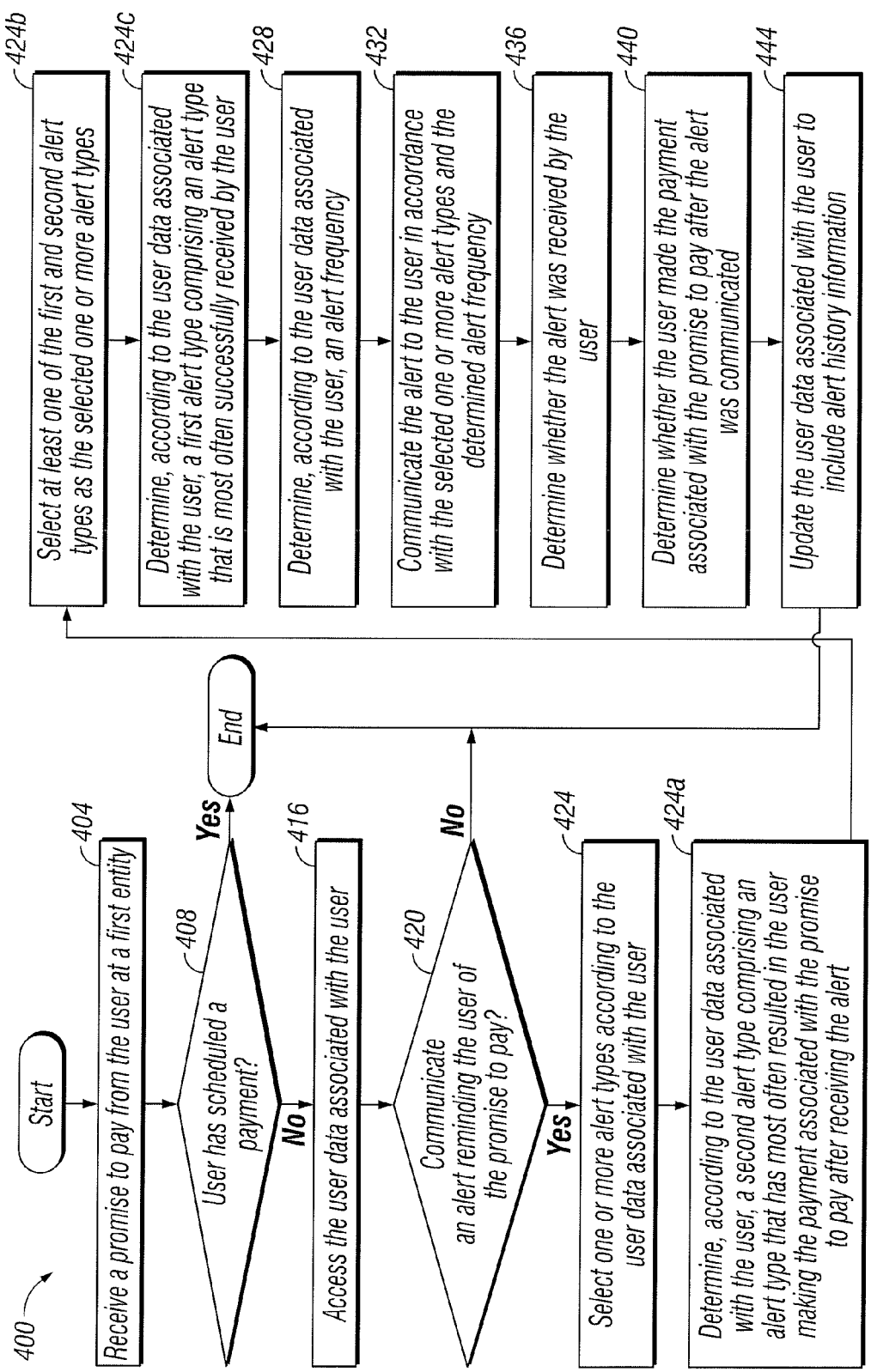
FIG. 4 illustrates a flow chart for a method of developing an automated alert notification plan for a user, in accordance with certain embodiments.

FIG. 4 illustrates a flow chart for a method of developing an automated alert notification plan for a user 102, in accordance with certain embodiments. The method may begin at step 404, when processor 116 receives a promise to perform from a user 102. As an example, the promise to perform may be a promise to pay. The present disclosure contemplates that the promise to pay may be received in any suitable manner. For example, user 102 may make a promise to pay using a website associated with enterprise 112. As another example, user 102 may make a promise to pay using an application associated with one or more user devices 104.

At step 408, system 100 may determine whether user 102 has scheduled a payment. As described above, user 102 may maintain more than one account with enterprise 112. As a result, processor 116 may be able to determine whether user 102 has scheduled a payment associated with the promise to pay using another account associated with user 102, such as a checking or savings account. For example, processor 116 may be able to determine that user 102 has scheduled a payment associated with the promise to pay using the bill pay engine 129. If processor 116 determines that user 102 has scheduled a payment associated with the promise to pay, the method may end. If system 100 determines that user 102 has not scheduled a payment associated with the promise to pay, the method proceeds to step 416. For example, processor 116 may determine that user 102 has not set up a payment using bill pay engine 129. As another example, where user 102 is a customer of another financial institution and maintains a credit card account with enterprise 112, processor 116 may be unable to see information associated with user 102's accounts with the other financial institution, and therefore make a determination that user 102 has not scheduled a payment. In some embodiments, processor 116 may have access to information associated with information for user 102's accounts with the other financial institution.

At step 416, processor 116 may access user data 127 associated with user 102. As described above with respect to FIG. 2A, user data 127 may include any suitable information associated with user 102. In some embodiments, user data 127 associated with user 102 may include information regarding accounts user 102 maintains with enterprise 112. As an example, user data 127 associated with user 102 may include the status of accounts user 102 maintains with enterprise 112, such as whether any of those accounts are past due. In some embodiments, user data 127 may include payment history for user 102. In some embodiments, payment history may include information relating to payments made on time by user 102, or whether user 102 has missed payments when they became due. In some embodiments, user information associated with user 102 may include information relating to a promise to pay made by user 102. In some embodiments, user data 127 associated with user 102 may include an alert type preference. User data 127 associated with user 102 may also include alert history information for alerts communicated to user 102. This alert history may include information about when alerts were sent, how the alerts were sent, whether an alert sent to user 102 was successfully received, and whether user 102 made the payment associated with the promise to pay after an alert was communicated. In some embodiments, user data 127 relating to alert history may be stored in alert module 126a.

At step 420, processor 116 determines whether to communicate an alert reminding user 102 of the promise to pay. In some embodiments, processor 116 may determine not to send an alert reminding user 102 of the promise to pay. For example, user 102 may have recently received an alert reminding him of the same promise to pay, and according to a determined alert frequency for user 102, described in more detail below with respect to step 440, it may be too soon to send an additional reminder.

In some embodiments, processor 116 may determine to communicate an alert reminding user 102 of the promise to pay, at which point the method may proceed to step 424. At step 424, processor 116 may select one or more alert types according to the user data 127 associated with user 102. As described above with respect to FIG. 2A, one or more alert types may be stored in alert module 126a. In some embodiments, the alert types may include any suitable manner of communicating an alert to user 102. For example, the one or more alert types may include a website, a phone call, an e-mail, a text message, or a chat room.

In some embodiments, the one or more alert types may be selected based on any suitable information. For example, the one or more alert types may be selected based on an alert type preference associated with user 102. As described above with respect to FIG. 2A, in some embodiments, user 102 may have an alert type preference. An alert type preference associated with user 102 may be stored in any suitable location. As one example, the alert type preference associated with user 102 may be stored in user data 127 associated with user 102. As another example, an alert type preference associated with user 102 may be stored in alert module 126a.

In some embodiments, the one or more alert types may be selected based on alert history associated with user 102. In some embodiments, alert history may be contained in user data 127 associated with user 102. In some embodiments, alert history may be stored in alert module 126a. Alert history associated with user 102 may indicate when alerts were sent to user 102, how they were sent, whether alerts previously sent to user 102 were successfully received, and whether user 102a subsequently made a payment associated with the promise to pay after receiving the alert. In some embodiments, alert history may include information relating to other alerts in addition to those reminding user 102 of a promise to pay. For example, alert history may include information relating to alerts notifying user 102 of a missed payment, such as those described above in relation to FIG. 2A. The manner in which alert history may be updated in certain embodiments is discussed in more detail below in relation to steps 436 through 444.

In some embodiments, processor 116 may perform a series of optional steps as part of selecting one or more alert types according to the user data 127 associated with the user. At step 424a, processor 116 may determine a first alert type. The first alert type may be the alert type that is most often successfully received by the user. For example, alert history associated with user 102 may indicate that user 102 has successfully received four alerts in the past. Alert history associated with user 102 may indicate that three of the successfully received alerts were text message alert types, and one of the successfully received alerts was an e-mail alert type. Processor 116 may determine, according to the alert history information associated with user 102, that the first alert type is a text message alert type because text message alerts have been most often successfully received by user 102. The manner in which processor 116 may determine whether an alert is successfully received is described in more detail below in relation to step 436.

At step 424b, processor 116 may determine a second alert type. The second alert type may be the alert type that has most often resulted in user 102 making a payment associated with the promise to pay after receiving the alert. For example, processor 116 may access alert history and payment history in user data 127 associated with user 102. Processor 116 may determine based at least in part on alert history that user 102 has received four alerts in the past. Alert history associated with user 102 may indicate that three of the alerts were text message alert types, and one of the alerts was an e-mail alert type. Payment history associated with user 102 may indicate that user 102 made a payment associated with the promise to pay after receiving each text message alert type, but that user 102 did not make a payment associated with the promise to pay after receiving the e-mail alert type. Processor 116 may determine, according to the alert history and payment history information associated with user 102, that the second alert type is a text message alert type because text message alerts have most often resulted in user 102 making the payment associated with the promise to pay after receiving the alert.

At step 424c, processor 116 may select at least one of the first and second alert types as the selected one or more alert types. In some embodiments, the first and second alert types described above in relation to steps 424a and 424b may be the same. In some embodiments, the first and second alert types described above in relation to steps 424a and 424b may be different.

At step 428, processor 116 may determine, according to user data 127 associated with user 102, an alert frequency. The present disclosure contemplates that the determined alert frequency may be any suitable schedule for sending one or more alerts to user 102 reminding user 102 of the promise to pay. In some embodiments, the alert frequency may be based at least in part on the user data 127 associated with user 102. As described above, user history may include payment history. In some embodiments, payment history associated with a user 102 may indicate numerous missed payments, which may result in an alert frequency being determined that sends alerts more often. In other embodiments, payment history for a user 102 may indicate only a small number of missed payments, which may result in an alert frequency in which alerts may be sent less frequently.

In some embodiments, processor 116 may determine the alert frequency based in part on whether or not the number of missed payments exceeds one or more threshold amounts. For example, if the number of missed payments associated with user 102 is below a first threshold, the determined alert frequency may be weekly alerts. If the number of missed payments exceeds the first threshold, the determined alert frequency may be every other day. If the number of missed payments exceeds a second threshold, the determined alert frequency may be daily alerts. The one or more thresholds may be set at any suitable number, and may vary according to particular applications of system 100. In some embodiments, the determined frequency may also include a duration. For example, processor 116 may determine an alert frequency of daily alerts for the duration of a week leading up to the due date associated with the promise to pay, or any other suitable time period.

In some embodiments, processor 116 may execute alert module 126a to determine an alert frequency. Alert module 126A may take into account a variety of parameters in determining an alert frequency for a user 102. In some embodiments, alert module 126a may consider payment history, as discussed above. In other embodiments, alert module 126a may base its determination of an alert frequency on any other suitable criteria. For example, alert module 126a may determine alert frequency based on alert history, the amount of time until the promise to pay is due, the amount due according to the promise to pay, or the number of promises to pay that have been or are associated with user 102.

At step 432, processor 116 communicates the alert to user 102. Processor 116 communicates the alert to network 110 (via interface 118) for delivery to user device 104 associated with user 102. The alert is communicated in accordance with the selected one or more alert types and the determined alert frequency. For example, if processor 116 selects two alert types from the one or more alert types in alert module 126a, such as an e-mail alert type and a text message alert type, and determines an alert frequency of daily alerts, processor 116 may communicate daily e-mail and text message alerts to user 102 reminding user 102 of the promise to pay.

At step 436, processor 116 may determine whether the alert was received by user 102. Processor 116 may determine whether an alert reminding the user of the promise to pay was received by user 102 in any suitable manner. In some embodiments, the manner in which processor 116 may determine whether an alert was received may be based at least in part on the alert types selected by processor 116 at step 424. As one example, if processor 116 selects an e-mail alert type, processor 116 may communicate an e-mail alert type containing a read receipt feature that notifies processor 116 when the e-mail alert is read. As another example, if a phone call alert type is selected, processor 116 may use one or more of several techniques to determine whether the alert is successfully received. For example, if the call is placed by a representative of enterprise 112, the representative may be able to communicate to processor 116 whether the call was successful. Similarly, if the call is an automated call, processor 116 may be able to monitor whether the call was picked up by user 102 and whether the duration of the call was sufficient to convey the necessary information. As another example, if processor 116 selects a text message alert type, the recipient may be offered the ability to respond to the text message to confirm receipt, or to click on a website link associated with user 102 to confirm receipt. In some embodiments, processor 116 may be able to store information relating to what alert types were successfully received by user 102 and what alert types were not successfully received.

At step 440, processor 116 may determine whether the user made the payment associated with the promise to pay after the alert was communicated to user 102 by processor 116. The present disclosure contemplates that this determination may be made in any suitable manner. As one example, processor 116 may determine whether the payment associated with the promise to pay was made, and determine the alert type of the one or more alerts communicated to user 102 prior to user 102 making a payment. Through historical tracking of this information, processor 116 may determine which alert types were most often associated with user 102 making the payment associated with the promise to pay.

At step 444, processor 116 may update user data 127 associated with user 102. The updated user data 127 associated with user 102 may include updated alert history. Alert history may include any suitable information about alerts communicated to user 102. In some embodiments, alert history includes information about when the alert was communicated, what alert types were used, whether the alert was received by user 102, and whether user 102 made the payment associated with the promise to pay after the alert was communicated. In some embodiments, updating the alert history contained in user data 127 associated with user 102 may advantageously allow processor 116 to more effectively select one or more alert types and determine alert frequency.

In operation, processor 116 may receive a promise to pay from a user 102. Processor 116 may determine that user 102 has not scheduled a payment associated with the promise to pay. In response to the determination that user 102 has not scheduled a payment associated with the promise to pay, processor 116 may access the user data 127 associated with user 102. In some embodiments, payment history contained in user data 127 associated with user 102 may indicate a history of missed payments. Processor 116 may determine to communicate an alert reminding user 102 of the promise to pay.

Processor 116 may select one or more alert types according to user data 127 associated with user 102. User 102 may have an alert type preference for e-mails. The alert history associated with user 102 may indicate that text message alerts are the alert type that has most often been successfully received by user 102. According to the user data 127 associated with user 102, processor 116 may select e-mail and text message alert types. Processor 116 may then determine an alert frequency based on any suitable information. For example, user data 127 associated with user 102 may indicate that user 102 has a history of numerous missed payments. Additionally, user data 127 associated with user 102 may indicate that user 102 promised to make a payment in one week. According to the user data 127 associated with user 102, processor 116 may determine to send daily alerts via e-mail and text message reminding user 102 of his promise to pay. Processor 116 may then communicate the alerts to user 102 in accordance with the selected alert types and determined alert frequency.

Processor 116 may determine whether the alerts were received successfully by user 102 in any suitable manner. For example, the e-mail alerts communicated to user 102 may have included a read receipt intended to indicate to processor 116 that the e-mail was received. As another example, user 102 may respond to the text message or click a link associated with user 102 included in the message that allows processor 116 to confirm receipt. Processor 116 may determine that the e-mails were not read because no read receipt was returned from user 102, but that user 102 received the text message because user 102 accessed the included link. Processor 116 may also determine whether user 102 made the payment associated with the promise to pay after the alerts were communicated to user 102. Processor 116 may update the user data 127 associated with user 102 to include the alert history. As an example, processor 116 may update the alert history to reflect that the text message alert type was successful but that the e-mail alert was not.

The present disclosure contemplates that any modifications and adjustments may be made to the above described method. For example, in some embodiments, once a user 102 confirms receipt of an alert reminding user 102 of a promise to pay, processor 116 may discontinue further alerts. As another example, the one or more alert types may include any suitable alert types. Although FIG. 4 describes alerts reminding a user 102 of a promise to pay, the present disclosure contemplates that the method may be used for any suitable alert notification system. For example, in some embodiments the method described in relation to FIG. 4 may be applied to circumstances involving notifications of missed payments, such as those described above in relation to FIG. 2A.

Figure 5:
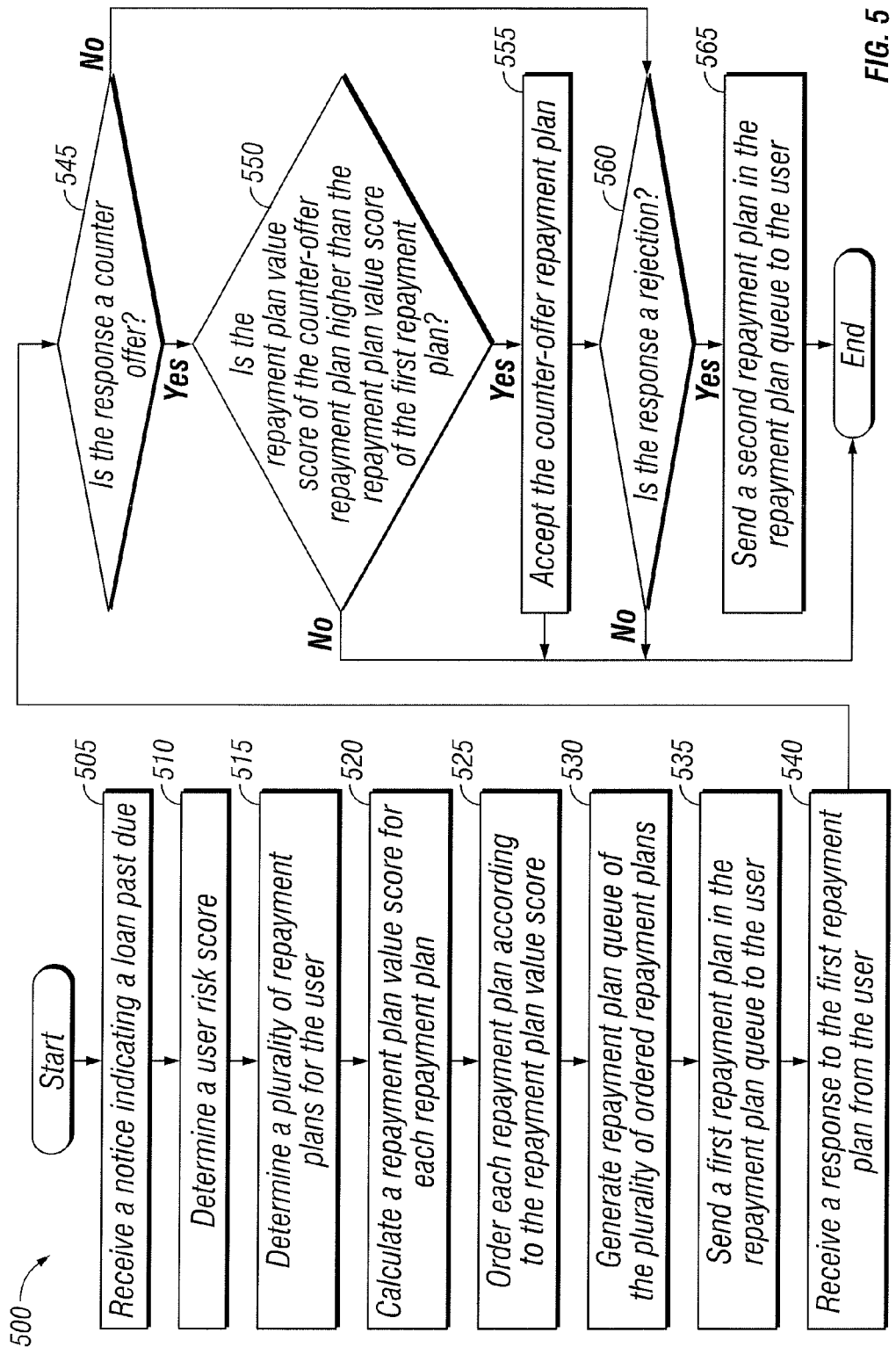
FIG. 5 illustrates an example method for developing a hierarchy of repayment plans, in accordance with certain embodiments.

FIG. 5 illustrates an example method for developing a hierarchy of repayment plans. At step 505, interface 118 receives a notice indicating a loan past due. The notice may include information associated with the loan past due associated with the user, such as the loan details, the amount of the payment due, amount of balance remaining on the loan, due date of the last payment, and line of business associated with the loan. At step 510, processor 116 determines a user risk score, the user risk score indicates the ability of the user to repay the loan past due. The user risk score is based on a user payment history with the user payment history comprising past payments on loans associated with the user.

At step 515, processor 116 determines a plurality of repayment plans for user 102. The repayment plans may comprise a schedule of payments (e.g., multiple payment amounts and associated payment due dates). Processor 116 determines the repayment plans using a variety of suitable criteria, including without limitation the calculated user risk score, the user payment history, the loan past due, and user information, credit risk, demographic information, type of loan, and/or other factors. In certain embodiments, repayment plan module 126b determines the plurality of repayment plans available according to the loan past due. In certain embodiments, repayment plan module 126b determines a plurality of offered repayment plans from the plurality of available repayment plans using the user risk score.

At step 520, processor 116 calculates a repayment plan value score for each repayment plan. The repayment plan value score is an indication of the commercial and/or financial benefit received from a particular repayment plan. The repayment plan value score may be calculated by processor 116 based on any suitable criteria, including without limitation the repayment plans, type of loan, amount due on the loan, past due date of the loan, interest rate of the loan, and/or other factors.

At step 525, processor 116 orders/prioritizes each repayment plan according to the repayment plan value score. In certain embodiments, the repayment offer module orders the repayment plans in the queue from lowest repayment score to highest repayment score, highest repayment score to lowest repayment score, or any variation of ordering the repayment plans according to the repayment value score. At step 530, processor 116 generates a repayment plan queue of the plurality of ordered repayment plans.

At step 535, interface 118 may communicate a first repayment plan in the repayment plan queue to user 102. User 102 may accept, deny, and/or modify (e.g., provide a counter offer to) the first repayment plan. At step 540, interface 118 receives a response to the first repayment plan from user 102. At step 545, processor 116 determines if the response is a counter offer. If the response is a counter-offer, method proceeds to step 550. At step 550, processor 116 calculates a repayment value score for the counter-offer repayment plan. If the repayment value score of the counter-offer repayment plan is higher than the repayment plan value score of the first repayment plan, then the method proceeds to step 555. At step 555, processor 116 accepts the counter-offer repayment plan and interface 118 communicates a notification to user 102 indicating the acceptance of the counter-offer repayment plan. If at step 550 the repayment value score for the counter-offer repayment plan is less than the repayment value score of the first repayment plan, processor 116 may reject the counter-offer repayment plan. In response to rejecting the counter-offer repayment plan, processor 116 may either discard the counter-offer repayment plan or slot it into the repayment plan queue at an appropriate location determined based on its repayment value score.

If at step 545, processor 116 determines that the response is not a counter-offer, the method proceeds to step 560 to determine if the response is a rejection to the first repayment plan. If the response is a rejection, the method proceeds to step 565 and interface 118 communicates a second repayment plan in the repayment plan queue to user 102. The method then ends.

Modifications, additions, or omissions may be made to the method depicted in FIG. 5. The method may include more, fewer, or other steps. For example, processor 116 may generate a repayment plan queue for the repayment plans that are above a predetermined repayment plan value score. As another example, steps may be performed in parallel or in any suitable order. While discussed as processor 116 and interface 118 performing the steps, any suitable component of system 10 may perform one or more steps of the method.

In an exemplary embodiment of operation, repayment plan module 126b may facilitate processes to develop a hierarchy of repayment plans. For example, processor 116 may execute the logic associated with repayment plan module 126b to perform the method and functionality described with respect to FIG. 1 and FIG. 5. A repayment plan is an form of payment or payments on a past due loan such that, when either added on to the current loan payments or paid separately, will make the loan up-to-date when finished paying. Enterprise 112 may adjust any suitable parameters of the loan as part of the repayment plan, such as payment due dates, amount due per payment, interest rate, total amount due on the loan (e.g., enterprise 112 may provide a discount on the loan in user 102 agrees to accelerate the repayment schedule).

Interface 118 may receive a notice indicating a loan past due associated with a user. The notice may include information associated with the loan past due associated with the user, such as the loan details, the amount of the payment due, amount of balance remaining on the loan, due date of the last payment, and line of business associated with the loan.

Processor 116 may determine a user risk score for a user, the user risk score indicates the ability of the user to repay the loan past due. The user risk score may be calculated by processor 116 based on any suitable criteria, including without limitation the user payment history, the loan past due, user information, credit risk, demographic information, and/or other factors. In certain embodiments, the loan past due comprises the loan details, amount of the payment due, amount of balance remaining on the loan, the number of payments made towards to loan past due, the due date of the last payment, and any other information that is associated with the loan past due.

Processor 116 may determine a plurality of repayment plans for user 102. The repayment plans may comprise a schedule of payments (e.g., multiple payment amounts and associated payment due dates). Processor 116 determines the repayment plans using a variety of suitable criteria, including without limitation the calculated user risk score, the user payment history, the loan past due, and user information, credit risk, demographic information, type of loan, and/or other factors. In certain embodiments, processor 116 determines the plurality of repayment plans available according to the loan past due. In some embodiments, processor 116 determines a plurality of offered repayment plans from the plurality of available repayment plans using the user risk score.

In another embodiment of operation, processor 116 calculates a repayment plan value score for each repayment plan. The repayment plan value score is an indication of the commercial and/or financial benefit received from a particular repayment plan. The repayment plan value score may be calculated by processor 116 based on any suitable criteria, including without limitation the repayment plans, type of loan, amount due on the loan, past due date of the loan, interest rate of the loan, and/or other factors.

Processor 116 orders each repayment plan according to the repayment plan value score. In certain embodiments, repayment plan module 126b orders the repayment plans in the queue from lowest repayment score to highest repayment score, highest repayment score to lowest repayment score, or any variation of ordering the repayment plans according to the repayment value score. Processor 116 may generate a repayment plan queue of the plurality of ordered repayment plans. The repayment plan queue is a sequence of repayment plans, such that the repayment plans in the queue can be distinguished be either its order in the sequence or an assigned value.

Interface 116 may communicate a first repayment plan in the repayment plan queue to user 102. User 102 may accept, deny, and/or modify (e.g., provide a counter offer to) the first repayment plan. In certain embodiments, user 102 may provide a counter-offer repayment plan to the first repayment plan. In this scenario, processor 116 may determine a repayment plan value score for the counter-offer repayment plan. If the repayment plan value score of the counter-offer repayment plan is higher than the repayment plan value score of the first repayment plan, then processor 116 may accept the counter-offer repayment plan. In alternative embodiments, interface 118 may receive a rejection from user 102. Interface 118 may communicate a second repayment plan in the repayment plan queue to user 102. User 102 may accept, deny, and/or modify the second repayment plan. In certain embodiments, if user 102 accepts a repayment plan, such as a second repayment plan, interface 118 may communicate the repayment plan to the line of business associated with the loan past due. In certain embodiments, repayment plan module 126b may communicate an authorization request to an authorization team or a line of business associated with the past due loan. Repayment plan module 126B may wait until receiving an approved message before proceeding. User 102 may also provide billing information to pay the payments of the accepted repayment plan. Interface 118 may communicate the accepted repayment plan and billing information to external payment service 134.

Figure 6:
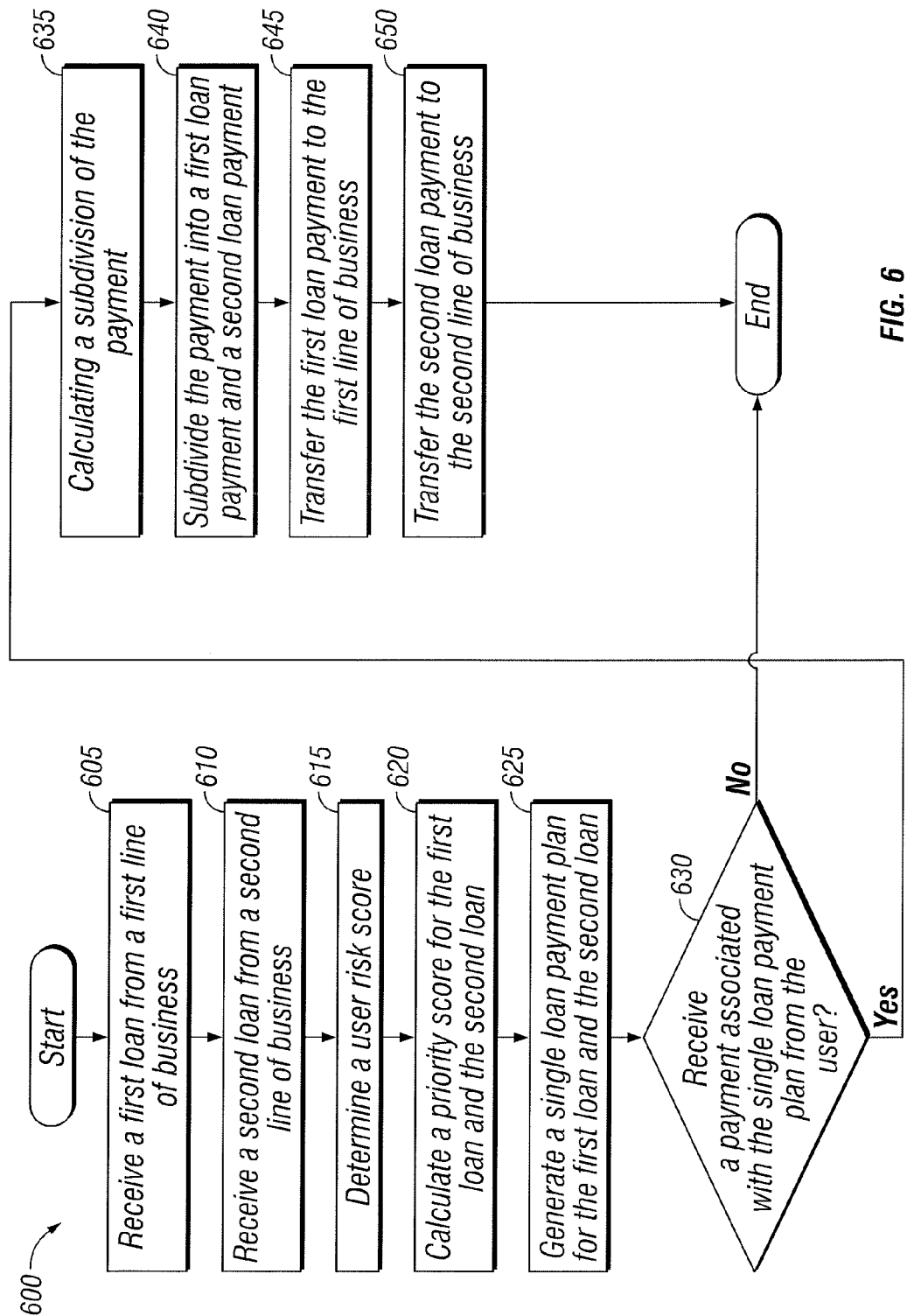
FIG. 6 illustrates an example method for integrating loans from various business units, in accordance with certain embodiments.

FIG. 6 illustrates an example method for integrating loans from various business units. At step 605, interface 118 receives a first loan that a first line of business associates with user 102 and, at step 610, a second loan that a second line of business associates with user 102. The first line of business may be associated with either an internal source 128 or an external source 132. Similarly, the second line of business may be associated with either an internal source 128 or an external source 132. The first and second loans may be up-to-date on payments or have payments that are past due. At step 615, processor 116 determines a user risk score, the user risk score indicates the ability of the user to repay the loan past due. The user risk score is based on a user payment history with the user payment history comprising past payments on loans associated with user 102, such as past payments on the first loan and the second loan.

At step 620, processor 116 calculates a priority score for the first loan and the second loan. The priority score for each loan may be calculated by processor 116 based on any suitable criteria, including without limitation the user payment history, user information, credit risk, demographic information, type of loan, amount of loan due, the due date of the loan payments, and/or other factors. In certain embodiments, interface 116 may communicate each loan to user 102 according to its priority score so that the user 102 may view each loan when viewing his or her account on user device 104. The loans may be ordered such that more important loans are distinguished from lesser important loans according to their priority score on device 104 (e.g., displaying loans in order of higher priority score to lowest priority score; highlighting certain loans above a priority score; using different text or different colors for different priority scores associated with the loan). Loans associated with a higher balance, a higher interest rate, a higher frequency of missed payments, or a longer period of being past due may tend to be higher priority.

At step 625, processor 116 generates a single loan payment plan for the first loan and the second loan using the first loan priority score, second loan priority score, first loan amount, second loan amount, first loan due date, second loan due date, customer information, and/or any other information pertaining to the repayment of the first loan and second loan. The single loan payment may comprise of a payment schedule with the payment schedule indicating the number of payments, the payment amounts, and the payment due dates associated with the single loan payment.

In certain embodiments, repayment plan module 126b determines the available payment plans for each loan. For example, repayment plan module 126b may determine that plan A and plan B are available to repay the first loan, and plan C and plan D are available to repay the second loan. Repayment plan module 126B may calculate a single loan using the information associated with each available payment plan (plans A, B, C, and D) and their associated priority score. For instance, repayment plan module 126b may calculate a single loan that combines and/or modifies aspects of the available payment plans A-D such that the loan with the highest priority score will be paid off first. In certain embodiments, repayment plan module 126b calculates a repayment plan value score for each available payment plan. As an example, suppose repayment plan module 126b scores the available plans as follows: plan A=10, plan B=5, plan C=8, plan D=2. Each available plan may be adjusted based on a weighted factor determined based on the priority score of its associated loan. As an example, if the first loan has a priority score of 2, the weighted score of plan A is 20 (i.e., 10×2) and the weighted score of plan B is 10 (i.e., 5×2). If the second loan has a priority score of 3, the weighted score of plan C is 24 (i.e., 8×3) and the weighted score of plan D is 16 (i.e., 8×20). Repayment plan module determines a single loan payment plan from two or more of the available payment plans that maximizes the combined repayment plan value score. In the example, repayment plan module 126b may combine plans A and C because these plans have the highest scores of the available plans.

At step 630, processor 116 determines whether interface 118 receives a payment associated with the single loan payment from user 102. If interface 116 receives a payment associated with the single loan payment plan, the method proceeds to step 635. At step 635, processor 116 calculates a subdivision of the payment using a variety of suitable criteria, including without limitation the first loan priority score, the second loan priority score, the first loan amount, the second loan amount, the first loan due date, the second loan due date, and any other factors that are relevant to subdividing the payment among separate loans. The subdivision may be a percentage, a specific value, or any type of indication that may subdivide a payment. At step 640, processor 116 subdivides the payment into a first loan payment and a second loan payment based on this calculated subdivision. Interface 118 transfers the first loan payment to the first line of business at step 645 and transfers the second loan payment to the second line of business at step 650. The method then ends.

Modifications, additions, or omissions may be made to the method depicted in FIG. 6. The method may include more, fewer, or other steps. For example, steps may be performed in parallel or in any suitable order. While discussed as processor 116 and interface 118 performing the steps, any suitable component of system 10 may perform one or more steps of the method.

In an exemplary embodiment of operation, repayment plan module 126b may facilitate processes to integrate loans from various business units. For example, processor 116 may execute the logic associated with repayment plan module 126b to perform the method and functionality described with respect to FIG. 1 and FIG. 6.

Interface 116 may receive a first loan associated with a user from first database associated with first line of business in internal source 128 or external source 132 and a second loan associated with a user from second database associated with second line of business in internal source 128 or external source 132. The loans may be up-to-date on payments or have payments that are past due. A loan is up-to-date if the user 102 is current on all of its loan payments. A loan is past due if one or more loan payments have not been made as of the payment due dates. Processor 116 may determine a user risk score for a user, the user risk score indicates the ability of the user to repay the loan past due. The user risk score may be calculated by processor 116 based on any suitable criteria, including without limitation the user payment history, the loan past due, user information, credit risk, demographic information, and/or other factors.

Processor 116 calculates a priority score for the first loan and the second loan. The priority score indicates the value of the loan to enterprise 132. The priority score for each loan may be calculated by processor 116 based on any suitable criteria, including without limitation the user payment history, user information, credit risk, demographic information, type of loan, amount of loan due, the due date of the loan payments, and/or other factors. In certain embodiments, repayment module 126B may communicate each loan to user 102 according to its priority score so that the user 102 may view each loan when viewing his or her account on user device 104. The loans may be ordered such that more important loans are distinguished from lesser important loans according to their priority score on device 104 (e.g., displaying loans in order of higher priority score to lowest priority score; highlighting certain loans above a priority score; using different text or different colors for different priority scores associated with the loan).

In a particular embodiment, processor 116 may calculate a user risk score for the user. Processor 116 may compare the user risk score to a predetermined consolidation threshold. The consolidation threshold is a threshold indicator that determines if a user is a candidate for a loan consolidation. The consolidation threshold may be fixed or variable.

Processor 116 may generate a single loan payment plan for the first loan and the second loan using the first loan priority score, second loan priority score, first loan amount, second loan amount, first loan due date, second loan due date, customer information, and any other information pertaining to the repayment of the first loan and second loan. The single loan payment may comprise of a payment schedule with the payment schedule indicating the multiple payments and associated payment due dates associated with the single loan payment. In certain embodiments, processor 116 determines the available payment plans for each loan. Using the available payment plans for each loan, processor 116 may calculate a single loan using the information associated with each available payment plan and their associated priority score. For instance, processor 116 may determine the combination of an available payment plan for each loan such that the loan with the highest priority score will be paid off first. In certain embodiments, processor 116 calculates a repayment plan value score for each available payment plan for each loan with a weighted factor of the loan's associated priority scores, and determines a single loan payment plan from two of the available payment plan that maximizes the combined repayment plan value score.

In certain embodiment, interface 118 receives a payment associated with the single loan payment plan from user 102. Processor 116 calculates a subdivision of the payment using a variety of suitable criteria, including without limitation the first loan priority score, the second loan priority score, the first loan amount, the second loan amount, the first loan due date, the second loan due date, and any other factors that are relevant to subdividing the payment among separate loans. The subdivision may be a percentage, a specific value, or any type of indication that may subdivide a payment. Processor 116 may subdivide the payment into a first loan payment and a second loan payment based on this calculated subdivision. Processor 116 may transfer the first loan payment to the first line of business and transfer the second loan payment to the second line of business.

Figure 7:
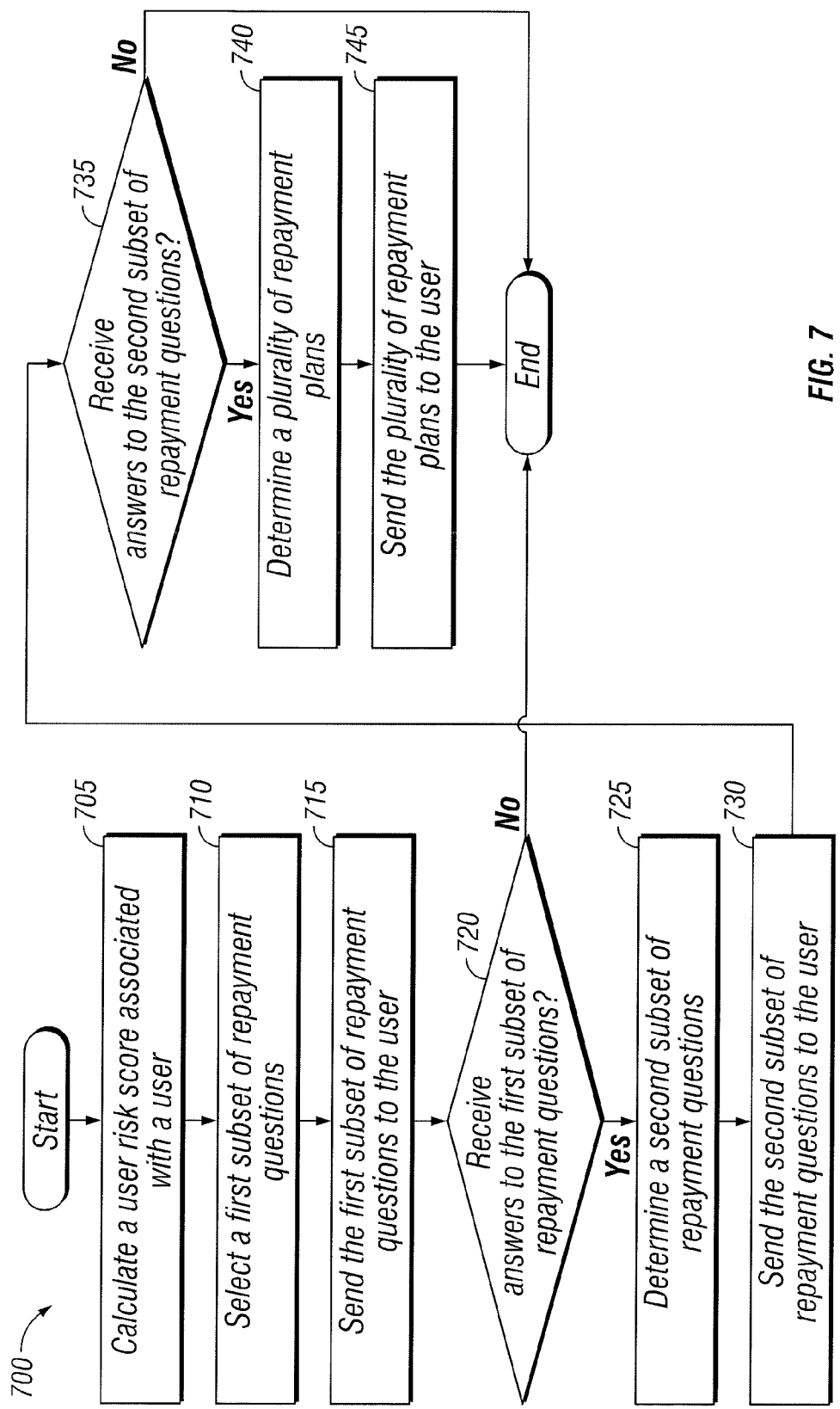
FIG. 7 illustrates an example method for dynamically modifying a loan repayment application, in accordance with certain embodiments.

FIG. 7 illustrates an example method for dynamically modifying a loan repayment application. At step 705, processor 116 calculates a user risk score associated with user 102. The user risk score indicates the ability of the user to repay the loan past due. The user risk score is based on a user payment history with the user payment history comprising past payments on loans associated with the user. At step 710, processor 116 selects a first subset of repayment questions from a set of repayment questions using the user risk score and the type of user device. Generally, the user risk score will correlate with the number of questions in the subset of questions, and the type of user device 104 will correlate with the length of questions. For example, a user accessing the site with a mobile phone may receive multiple short questions, where a user accessing from a desktop may receive a longer question that encompasses the multiple short questions. At step 715, interface 118 will communicate the first subset of repayment questions to user 102. At step 720, processor 116 determines whether interface 118 receives answers to the first subset of repayment questions from user 102. If interface 118 receives answers to the first subset of repayment questions from user 102, the method proceeds to step 725.

At step 725, processor 116 determines a second subset of repayment questions based on the answers to the first subset of repayment questions. For example, user 102 may respond to a question that necessitates a follow-up question. Processor 116 may use the repayment question rule set, located in repayment plan module 126b, to determine the correlation between the answer or answers to one or multiple questions and additional repayment question or questions in the set of repayment questions to ask of user 102. Interface 118 communicates the second subset of repayment questions to user 102 at step 735. At step 720, processor 116 determines whether interface 118 receives answers to the second subset of repayment questions from user 102. If interface 118 receives answers to the first subset of repayment questions from user 102, the method proceeds to step 740.

At step 740, processor 116 determines a plurality of repayment plans based on the user risk score associated with user 102, the answers to the first subset of questions, and the answers to the second subset of questions, the past due loan, and any other factors that aid in determining the type of offered repayment plans. In certain embodiments, processor 116 may determine a repayment plan value score for each repayment plan. Processor 116 may also create a user repayment score based on the user risk score, the answers to the first subset of questions, the answers to the second subset of questions, and any other factors indicative of a user's capability of repaying a loan. In certain embodiments, processor 116 compares the user repayment score with the repayment plan value score to determine a plurality of repayment plans to offer to user 102. At step 745, interface 118 communicates the plurality of repayment plans to user 102. The method then ends.

Modifications, additions, or omissions may be made to the method depicted in FIG. 7. The method may include more, fewer, or other steps. For example, processor 116 may verify the accuracy of the answers to the first subset of questions. As another example, steps may be performed in parallel or in any suitable order. While discussed as processor 116 and interface 118 performing the steps, any suitable component of system 10 may perform one or more steps of the method.

In an exemplary embodiment of operation, repayment plan module 126b may facilitate processes to dynamically modify a loan repayment application. For example, processor 116 may execute the logic associated with repayment plan module 126b to perform the method and functionality described with respect to FIG. 1 and FIG. 7.

Processor 116 may determine a user risk score associated with user 102. Using the user risk score and type of user device 104 of user 102, processor 116 selects a first subset of repayment questions from a set of repayment questions. The repayment questions are a population of questions that enterprise 112 may ask user 102 to determine if user 102 is eligible for one or more repayment plans. Example repayment questions include but are not limited to the following: "What is your net worth?"; "What is your credit score?"; "What is your current occupation?"; "How long have you been employed at your current position?"; or "Are you aware of any hardships that may prevent you from repaying the payments on a repayment plan?". Generally, the user risk score will correlate with the number of questions in the subset of questions, and the type of user device 104 will correlate with the length of questions. For example, a user accessing the site with a mobile phone may receive multiple short questions, where a user accessing from a desktop may receive a longer question that encompasses the multiple short questions. Interface 118 will communicate the first subset of repayment questions to user 102. Interface 118 may receive answers to the first subset of repayment questions from user 102.

Processor 116 may determine a second subset of repayment questions based on the answers to the first subset of repayment questions. For example, user 102 may respond to a question that necessitates a follow-up question. Processor 116 may use the repayment question rule set, located in repayment plan module 126b, to determine the correlation between the answer or answers to one or multiple questions and additional repayment question or questions in the set of repayment questions to ask of user 102. The repayment question rule set is a set of rules mapping the answer or answers to one or multiple sets of questions to additional question or questions. Interface 118 may communicate the second subset of repayment questions to user 102, and receiving answers to the second subset of repayment questions from user 102.

In a particular embodiment, processor 116 may verify the accuracy of the responses to the question. Processor 116 may use user information from user information, verification logic, information collected from external sources, or any other information associated with the answer to the repayment questions. Verification logic may comprise of a set of verification rules that indicate an inaccuracy in the answer. For example, a verification rule may be that the house mortgage is greater than a user's net worth. Processor 116 may compare the answers to the repayment questions with the user information to determine the accuracy of the response and/or apply verification logic. If the response is not accurate, processor 116 may ask the repayment question again to user 102, modify the question presented to user 102, or proceed in a manner such that repayment module 126B accounts for the inaccuracy in the answer.

In certain embodiments, processor 116 determines a plurality of repayment plans based on the user risk score associated with user 102, the answers to the first subset of questions, and the answers to the second subset of questions, the past due loan, and any other factors that aid in determining the type of offered repayment plans. In certain embodiments, processor 116 may determine a repayment plan value score for each repayment plan. Processor 116 may also create a user repayment score based on the user risk score, the answers to the first subset of questions, the answers to the second subset of questions, and any other factors indicator of a user's capability of repaying a loan. In certain embodiments, processor 116 compares the user repayment score with the repayment plan value score to determine a plurality of repayment plans to offer to user 102. In certain embodiments, interface 118 may communicate an approval request to an authorization team or internal source 128 to authorize offering the repayment plan to user 102.

Interface 118 may wait to receive an approved message from the authorization team or internal source 128 before proceeding. Interface 118 may communicate the plurality of repayment plans to user 102, and the user may accept or deny the repayment plan.

Figure 8A:
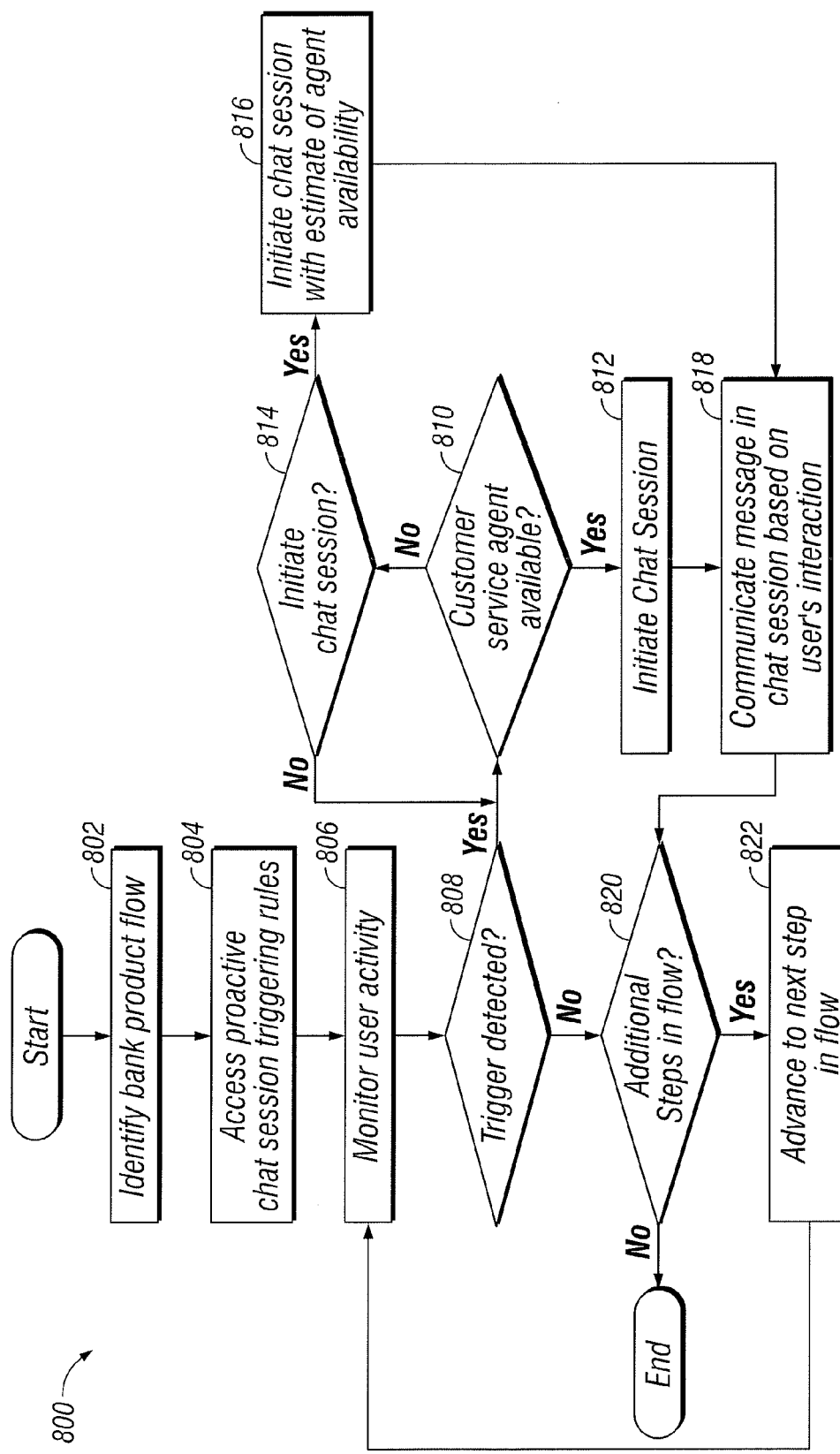
FIG. 8A illustrates an example method that proactively initiates a chat session based on a user's interaction with a network accessible application, in accordance with certain embodiments.

FIG. 8A illustrates an example method 800 that proactively initiates a chat session based on a user's interaction with network accessible content, for example, on a website. The user's interaction with the network accessible content may be through a predefined bank product flow. Flows may exist to step a user 102 using a user device 104 through a defined sequence of events for various products/applications associated with enterprise 112. For example, a flow may exist for stepping a "preferred" user through required steps to apply to be a part of a repayment program for past due bills. Another flow may exist for non-preferred users seeking to apply for a repayment program. As another example, a flow may exist to allow a user to apply for loan program through enterprise 112. Method 800 proactively initiates a chat session based on triggers associated with particular steps in a bank product flow. The chat session may allow a user to communicate with a customer service agent associated with an enterprise, such as enterprise 112, that is providing the bank product. This may facilitate completion of the entire bank product flow by the user.

In certain embodiments, components of system 100, such as processor 116, may execute rules stored in chat initiation module 126c and/or any other suitable module to perform the steps of method 800. Additionally, other modules 126 may utilize chat initiation module 126c when communicating with a user using user devices, such as user devices 104 of system 100. Certain modules, such as chat initiation module 126c, may include rules for indicating particular conditions (or triggers) for proactively initiating a chat session. The rules may be specific to particular bank product flows, such that each bank product flow may have its own defined set of triggers.

The method may begin at step 802 in which a bank product flow is identified. This may occur, for example, in association with a request for a bank product received through interface 118. Processor 116 may associate the request for the bank product with a particular bank product flow based on rules stored in components of memory 124, such as chat initiation module 126c. As another example, server 114 may direct a user browsing on a website serviced by server 114 to enter a flow, such as a repayment program flow if the user has user data 127 that indicates that the user is past due on certain bills. The method may identify the flow using any other suitable technique.

At step 804, the method accesses proactive chat session triggering rules associated with the identified bank product flow. Such proactive chat session triggering rules may be stored/maintained in a module of system 100, such as chat initiation module 126c. In certain embodiments, the proactive chat session triggering rules may be associated with particular bank product flows, such that the triggers for particular bank product flows may be different. Additionally, each step in a particular bank product flow may be associated with particular triggers, such that the triggers for particular steps in one bank product flow may be different.

As an example, a trigger may include a condition that the user has remained idle for a period of time beyond that specified in by an idle time threshold, such as 10 seconds. In certain embodiments, "idle" time may be determined according to types of actions, such that actions to proceed to next step in flow (e.g., pressing a "Continue" button) may qualify as non-idle actions. Actions that do not advance the next step in the flow, such as mouse (and/or other input tool) movements may qualify as idle actions, such that their detection would not restart a timer associated with detecting idle time of a user on a website.

As another example, a trigger may include a condition that one or more actions performed using a GUI, such as GUI 108, correspond to a user action sequence trigger. User action sequence triggers may correspond to a specific sequence of actions using a GUI, such as pressing the "back" button on a browser application a specified number of times (e.g. twice or three times), pressing the "back" button followed by the "forward" button, and/or any other suitable sequence. In certain embodiments, such a rule may provide that a trigger condition is meet when the user has not changed any values on the traversed web pages of a bank product flow (e.g., values provided in response to questions asked to determine whether the user qualifies for a bank product). For example, the user may be traversing web pages without providing responses to questions posed to apply for a bank product. A rule may specify that that this satisfies a trigger condition, in certain embodiments.

As another example, a trigger may include whether the user has exited a bank product flow prior to completion of the bank product flow (e.g., if the user exits repayment program application flow prior to submission of the application). Any other suitable chat session triggering rules may be used in association with method 800 and/or system 100.

At step 806, the method monitors activity of the user interacting with the website that administers the bank product flow. As an example, through network 110, server 114 may be in communication with a browser application or native application resident on a user device, such as user device 104, used to access the website using GUI 108. The browser application or native application may provide information regarding the user's interaction with GUI 108 such as user keystrokes, movement of an input tool (such as a mouse, stylus, finger, and/or any other suitable input tool), interaction with the browser application or native application (such as using "back" or "forward" buttons, selecting particular menu/object options on GUI 108), and/or any other suitable interaction with the GUI 108 associated with browser or native application.

At step 808, the method compares the activity detected in step 806 with the rules accessed in step 804 to determine whether one or more of the triggers has occurred. In order to facilitate this determination, the method may maintain a running history of detected actions performed by the user. These detected actions may be stored in user data 127, for example. In order to facilitate detecting triggers related to the passage of time, processor 116 may access any suitable timers resident on server 114 and/or elsewhere in system 100. If a trigger is detected the method proceeds to step 810.

At step 810, the method determines availability of a customer service agent to engage in a chat session with the user. For example, server 100 may maintain a queue of agents indicating whether those agents are available to chat with users requiring assistance with bank product flows. The customer service agents may use devices similar to user devices 104 that are communicatively coupled to server 114. If there is a customer service agent available, the method may initiate the chat session proactively at step 812. This may be done without waiting for the user to request a chat session with a customer service agent. If there is no customer service agent available, the method may proceed to step 814.

At step 814, the method determines whether a chat session should be initiated with the user even though no customer service agents are currently available. If so, the method proceeds to step 816 in which the chat session is initiated along with an estimate of the time the user will be waiting for a customer service agent to become available. If at step 814, it is determined that a chat session will not be initiated, the method may return to step 810 to determine if a customer service agent has become available. In this way, the method may wait for a service agent to become available before initiating a proactive chat session. Alternatively, the method may return to step 806 to continue monitoring user activity.

At step 818, a message is communicated to the user based on the user's interaction with the website through a GUI. For example, the activity detected during step 806 may indicate that the user has a mouse hovering over a particular question or disclosure associated with the bank product flow. During step 818, server 114, through processor 114 and/or any other suitable component, may communicate a message to be displayed to the user in a proactive chat session window asking whether the user has a question about that topic. This may encourage a user to ask for the help that they need in order to complete the bank product flow.

The method may then proceed to step 820, which determines whether there are additional steps in the bank product flow. If so, the method advances to the next step in the flow (e.g., upon selection of a "next," "continue," or other suitable advancement option on the GUI) and returns to step 806 to monitor the user's activity, which may be used to determine whether a trigger condition for setting up a proactive chat session during that step in the bank product flow has been satisfied at step 808. If there are no additional steps in the flow, the method may end.

Modifications, additions, or omissions may be made to method 800 described herein without departing from the scope of the invention. The steps may be combined, modified, or deleted where appropriate, and additional steps may be added. For example, step 810 may be modified to wait always for a customer service agent to become available, such that steps 814 and 816 may not be performed. Additionally, the steps may be performed in any suitable order (including in parallel) without departing from the scope of the present disclosure.

FIG. 8B illustrates an example embodiment of a GUI 850 that presents a chat session proactively to a user interacting with a website. The illustrated bank product flow relates to a past due payments. List object 852 includes a plurality of options associated with the reason the user has not made a payment. The user is hovering over the "I already mailed a payment" option in list object 852 but is hesitating prior to selecting "Continue" button 854. GUI 850 includes a user initiated chat session object 856 that the user may select to initiate a session with a customer service agent. In the illustrated embodiment, the server associated with a bank enterprise, such as enterprise 112, has determined that the user has remained idle for a time period exceeding an idle time threshold. As such, the server sends instructions to GUI 850 to display proactive chat session window 858. Proactive chat session window 858 may open without waiting for the user to select user initiated chat session object 856 (e.g., without waiting for the user to select user-initiated chat session object 856). Proactive chat session window 858 displays a message indicating "Would you like to speak to a customer service agent regarding a payment that you mailed" because the user has idled over selecting a related topic in list object 852.

Modifications, additions, or omissions may be made to GUI 850 described herein without departing from the scope of the invention. For example, GUI 850, in certain embodiments, may relate to a different step in the past due payment flow or to a different bank product flow altogether. As another example, proactive chat session window 858, in certain embodiments, may display a generic message asking the user to chat without referring to a topic selected in list object 852.

Figure 9:
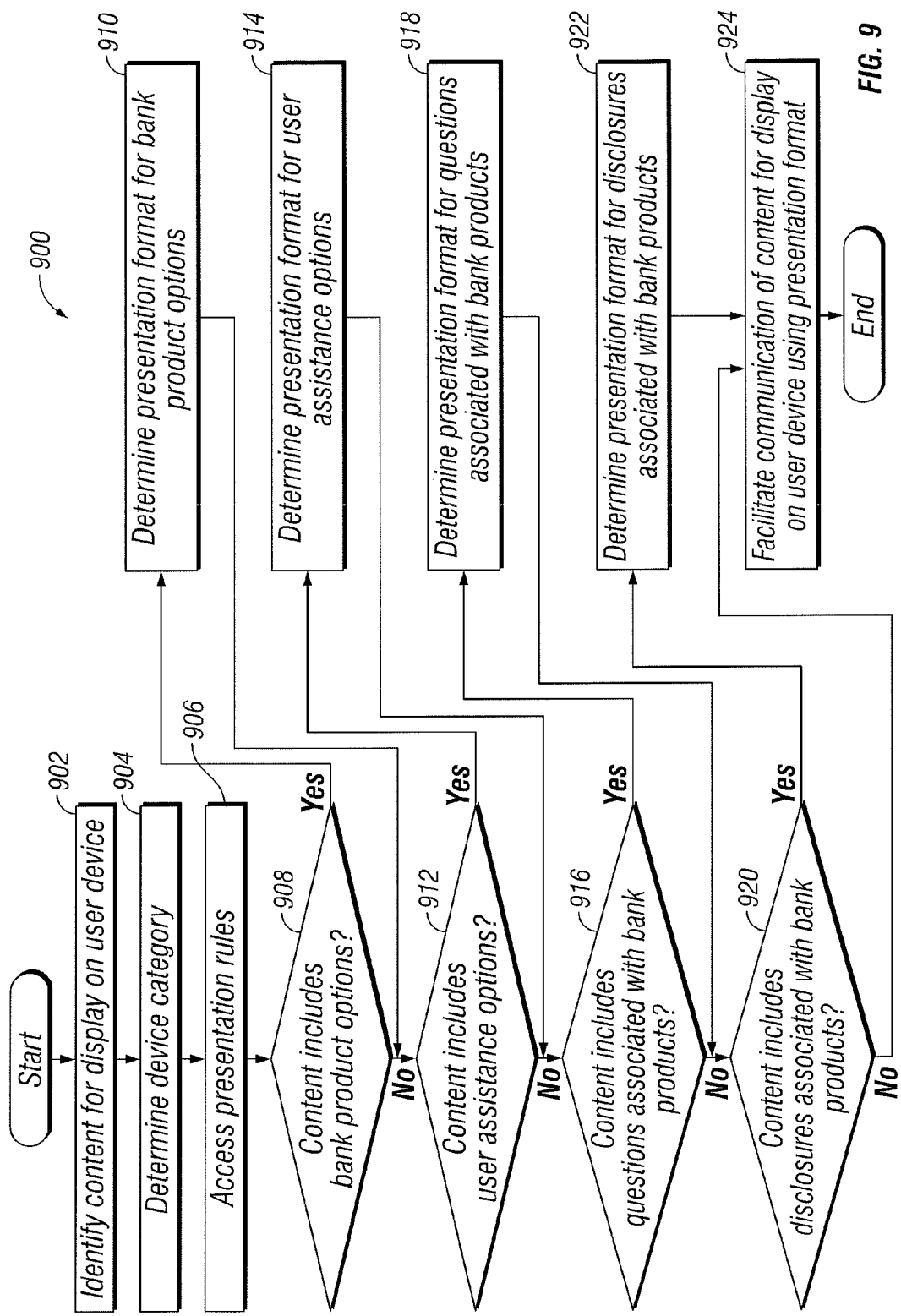
FIG. 9 illustrates an example method that customizes presentation of a network accessible content according to a category of user device used to access the content, in accordance with certain embodiments.

FIG. 9 illustrates an example method 900 that customizes presentation of a network accessible content according to a category of user device used to access the content. The content may relate to information related to certain bank products (e.g., a loan and/or repayment program), customer assistance options presented on the user device, questions to be answered by a user in order to apply for one or more bank products, disclosures associated with acceptance of the terms associated with bank product, and/or any other suitable item for display on a user device, such as user device 104 of system 100. In certain embodiments, components of system 100, such as processor 116, may execute rules stored in presentation module 126d and/or any other suitable module to perform the steps of method 900. Additionally, other modules 126 may utilize presentation module 126d when communicating content for display to user devices, such as alert module 126a.

The method may begin at step 902 in which content may be identified for display on a user device. In certain embodiments, the content may be associated with a request received through an interface, such as interface 118 of system 100, to view available bank products. The bank products may include applications for loans, repayment/settlement programs associated with past due payments of one or more accounts of a user, and/or any other suitable bank product.

In certain embodiments, method 900 may proactively identify content for presentation on a user device in addition to and/or without waiting for a request from the user device. For example, server 114 (through alert module 126a, repayment plan module 126b, presentation module 126d, processor 116, and/or any other suitable modules) may monitor activity of a user 102 accessing a website associated with enterprise 112 through user device 102. Such modules may also access user data 127 associated with user 102. Content for display on a user device may be identified based on user activity, user data, and/or any other suitable information.

In some embodiments, content for display may be associated with certain flows available for presentation on a user device. As described above, flows may exist to step a user 102 using a user device 104 through a defined sequence of events for various applications associated with enterprise 112. For example, a flow may exist for stepping a "preferred" user through required steps to apply to be a part of a repayment program for past due bills. Another flow may exist for non-preferred users seeking to apply for a repayment program. A processor 116 may identify any suitable flow and associated content for display on a user device.

At step 904, the method determines a device category associated with the user device. In certain embodiments, a module of server 114 may identify device information associated with a device. For example, communications received from a user device may include certain fields related to the type of user device accessing the network-accessible content, such as model number, operating system, display size, functional capabilities, and/or any other suitable information.

In certain embodiments, a module of server 114, such as presentation module 126d, may include rules for associating information received with a device category. As non-limiting examples, a user device with model number "iPhone X" may be associated with a mobile phone device category, a user device with model number "Surface X" may be associated with a tablet device category, and a user device with model number "Latitude X" may be associated with a laptop device category. As another example, rules may exist for associating user device with a category according to screen size. For example, devices with screen sizes equal or smaller than a first screen size threshold, such as 5 inches, may be associated with a small device category. Devices with screen sizes larger than the first screen size threshold and equal or smaller than a second screen size threshold, such as 10 inches, may be associated with a medium device category. Devices with a screen size larger than the second screen size threshold may be associated with a large device category. The user device may provide screen size information directly to server 114 and/or certain modules of server 114 may store size information for particular device model numbers and associated them with device size categories. As another example, devices may be categorized according to the functions they are able to carry out. Any other device categorization may be used with method 900 and/or system 100 in step 904

At step 906, presentation rules are accessed, such as those stored in presentation module 126d. The presentation rules may determine presentation format for the content on the user device according to the content and the determined device category. For example, the presentation rules may indicate formats for presenting bank product options (such as available repayment/settlement programs), customer assistance options, questions associated with bank product options, disclosures associated with acceptance of a bank product, such as a repayment program, and/or any other suitable information. The rules may indicate different ways of presenting content based on the category of device associated with accessing user device, such as user device 104 of system 100. In certain embodiments, the rules may be associated with certain flows, resulting in a customized experience for each flow based on the category of user device. Depending on the device category, the method may direct that the user log in using a different device, remove/reword certain language that may appear on a web page to make it more readable for a smaller device, break up content for disclosures into smaller pieces distributed across a number of webpages, and/or any other suitable way of customizing the viewing experience to a specific category of devices.

At step 908, the method may determine whether the identified content for display on the user device includes bank product options. This may be a list or some other indication of bank products that can be applied for using the accessing user device, bank products for which information may be accessed/reviewed using the accessing device, and/or any other suitable indication. If the content includes bank product options, the method proceeds to step 910 in which a presentation format may be determined for the bank product options.

The presentation formats for bank products may differ according to the device category. For example, the rules may indicate that certain device categories may present less than the all of the plurality of bank product options based on the determined device category. This may occur, for example, if certain requirements for completion of application for a bank product will not (or cannot) be completed over the accessing device, such as viewing, saving, and/or printing of a pdf. Other example functions that may be required include e-signing, viewing of images, uploading documents, and/or any other suitable function. As another example, the rules may indicate that certain device categories, such as mobile phones, should display a message indicating that the user should log in using a different device to initiate and/or complete applications for certain bank products. The message may include a link that, when clicked, takes the user directly to the part of the flow on a website at which the user left off in the application when using the prior user device. In certain embodiments, system 100, for example, may e-mail such a link to the user to access when using another user device.

At step 912, the method may determine whether the identified content for display on the user device includes user assistance options. User assistance options may include a "call me" button, e-mail contact, chat options, and/or any other suitable assistance option. A "call me" button, when pressed by the user, may direct a customer service agent to call the user. An e-mail contact option may allow a user to send an e-mail or other text-based question directly to a customer service agent through a graphical user interface, such as GUI 108. A chat option may allow the user to engage in an interactive chat session with a customer service agent through GUI 108, for example. The user may initiate the chat session by clicking on a link. In certain embodiments, the chat session may be initiated proactively by server 114, for example, in response to detection of certain activity (and/or inactivity) by the user on the website. These user assistance options may provide a way for the user to gain assistance in obtaining information or completing one or more bank product applications. If the content includes user assistance options, the method may proceed to step 914 in which a presentation format may be determined for the user assistance options.

The presentation formats for user assistance options may differ according to the device category. For example, users on desktop or laptop computers, in certain embodiments, may be presented with a proactive chat session while users on mobile phones may be presented with "call me" user assistance options.

At step 916, the method may determine whether the identified content includes questions associated with bank products. If the content includes questions associated with the bank products, the method may proceed to step 918 in which a presentation format may be determined for presenting these questions on the user device according to the device category.

The presentation formats for the questions may differ according to the device category. The questions may ask a user certain questions used in ascertaining whether a certain bank product, such as a repayment program is an appropriate option for a user. Such questions, for example, may relate to income, employment, and personal expenses of a user. In certain embodiments, some of this information may not be necessary in order for enterprise 112, for example, to determine whether to provide the program/bank product to the user. For example, an "Employer Name" may not be necessary for determining whether a user qualifies for a repayment program and the associated terms. Such optional questions, in certain embodiments, may be excluded from the questions presented on smaller devices, such as mobile phones. As another example, the questions to the user may be presented on multiple web pages if presented on smaller devices, such as mobile phones. In some embodiments, the presentation format may be defined to present one question per page along with a text box or multiple choice response options with questions. As another example, the user may be asked to provide responses to additional questions at a later time using a different device.

At step 920, the method may determine whether the identified content includes questions associated with acceptance of a selected bank product option by the user. For example, the user may complete an application for a bank product that requires review and acceptance of certain requirements as provided in a disclosure. This may be one of the final steps in a flow. If the content includes disclosures associated with the acceptance of terms associated with a bank product, the method may proceed to step 922 in which a presentation format may be determined for presenting the disclosure on the user device.

The presentation formats for the questions may differ according to the device category. For example, a particularly large disclosure may be distributed across multiple web pages when presented on a user device associated with a small device category and/or on a mobile phone. The user may indicate readiness to move along to succeeding pages, in certain embodiments, by pressing a "CONTINUE" button at the bottom of the webpage. As another example, the presentation format may provide for communication of a network-accessible link as noted above. As another example, the disclosure may be summarized with fewer words for disclosures associated with certain device categories, such as mobile phones, than the full length disclosures as displayed on devices associated with other device categories, such as desktop or laptop computers. The user may be informed that it may access the full-length disclosures by logging on from a suitable device.

At step 924, the content may be communicated for display on the user device according to the determined presentation format and the determined device category. A processor, such as processor 116 of system 100, may direct an interface, such as interface 118, to communicate the content to network 110 for eventual display on a user device 104. The content may be formatted according to any suitable protocols, such as HTML, PHP, ASP, JSP, JavaScript, any other suitable protocol, and/or any suitable combination of the preceding. Additionally, the content may be displayed on GUI 108 associated with a browser application, a native application installed on user device 104 and associated with enterprise 113, any other suitable application, and/or any suitable combination of the preceding. After step 924, the method may end.

Modifications, additions, or omissions may be made to method 900 described herein without departing from the scope of the invention. The steps may be combined, modified, or deleted, where appropriate, and additional steps may be added. For example, step 906 may be a part of or performed with any of steps 910, 914, 918, and/or 922, as needed. As another example, instead of ending at step 924, the method may loop back to step 902 to start the process again of identifying additional content for display on a user device. Additionally, the steps may be performed in any suitable order without departing from the scope of the present disclosure. For example, steps 908, 912, 916 and 920 may be performed in parallel. As another example, step 904 may be performed before step 902.

Figure 10B:
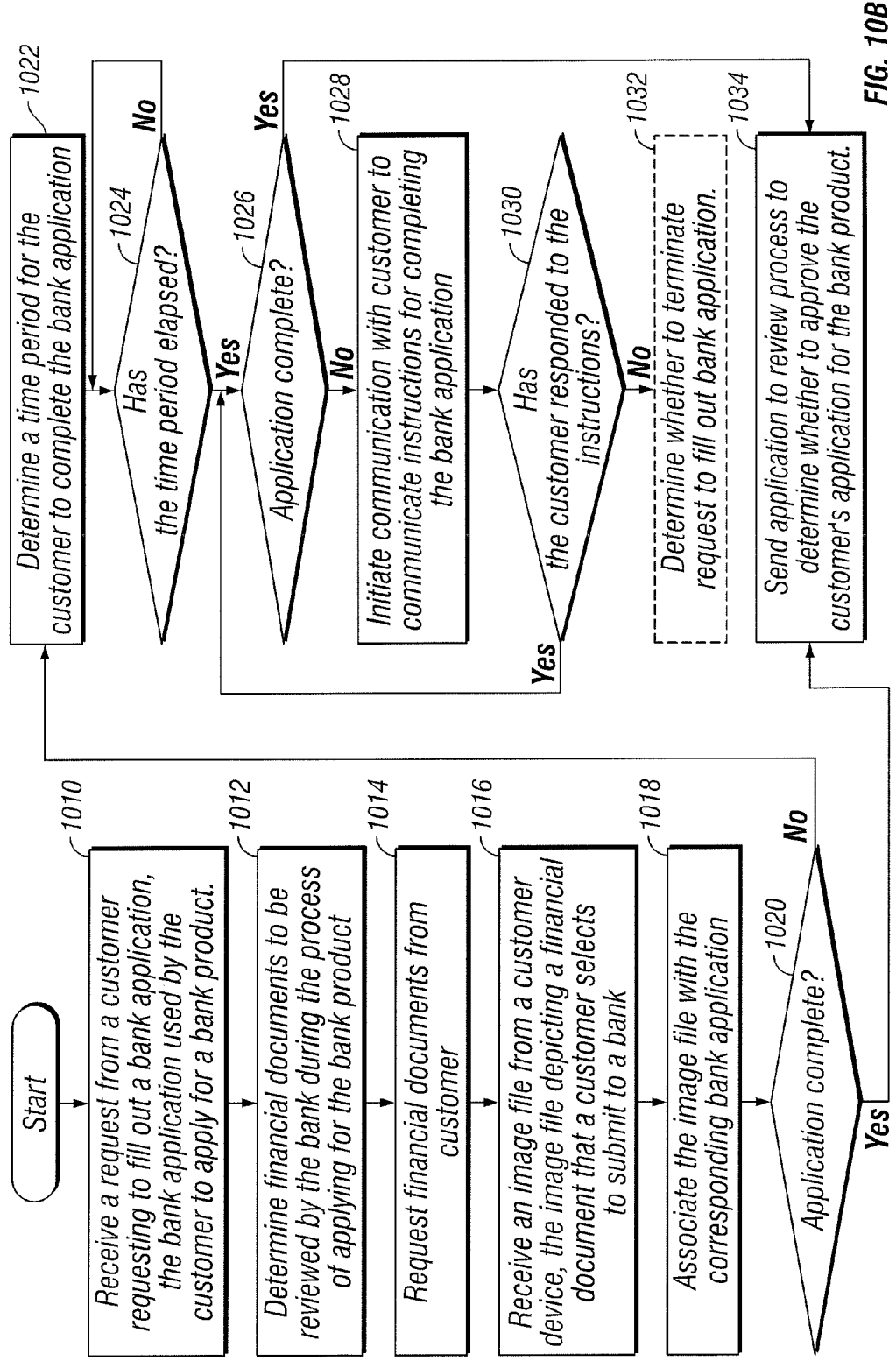
FIG. 10B illustrates an example of a method for preparing a bank application using a user device, in accordance with certain embodiments.

FIGS. 10A-10E illustrate an example embodiment in which a customer (e.g., user 102) interacts with user device 104 to apply for a bank product. FIG. 10A illustrates an example of a bank application 1000 that a customer submits to a bank in order to apply for a loan or other suitable bank product. In some embodiments, the customer fills out bank application 1000 using a smartphone, a tablet, a laptop, or other user device 104. The customer interacts with user device 104 to submit the completed bank application 1000 to one or more processors 116 associated with the bank.

Bank application 1000 includes any suitable information that the bank solicits from the customer in order to evaluate whether to provide the bank product to the customer. Examples of information that the bank solicits from the customer include a customer identifier, an application identifier, a bank product type, a monetary amount, and a list of financial documents that the bank verifies in order to approve the customer's application for the bank product.

The customer identifiers identify the customer that is applying for the bank product. Examples of customer identifiers include the customer's name, social security number, date of birth, driver's license number, taxpayer id, customer identifier (e.g., an identifier for a savings account, checking account, credit card account, investment account, other financial account, or user profile that the bank associates with the customer), etc. The bank may request any suitable combination of customer identifiers in order to accurately identify the customer.

The application identifier may be used to identify bank application 1000. For example, if bank application 1000 is stored in a database, the application identifier XXXX can be used to retrieve bank application 1000. The application identifier may also be used to link together portions of bank application 1000. For example, if portions of bank application 1000 include a questionnaire and a number of attachments (such as the financial documents described below), the bank application identifier can be used to associate the portions of the same bank application 1000 with one another.

Bank application 1000 also identifies the type of bank product that the customer is applying for. Examples of bank products include a mortgage, a car loan, a boat loan, a credit line, a credit card account, installment loan, and a home equity line of credit. FIG. 10A illustrates an example in which the customer selects a bank product (such as a mortgage) from a list of bank product options. In other embodiments, each bank product could have its own form that a customer would fill out to apply for that type of bank product.

Bank application 1000 indicates the monetary amount of the loan that the customer is applying for. As examples, the customer might want to apply for a $1,000 credit card limit, a $10,000 car loan, or a $100,000 mortgage.

As part of the approval process for bank application 1000, the bank may require the customer to provide certain financial documents. The financial documents help the bank evaluate the customer's ability to repay a potential loan. Thus, the bank uses the information in the financial documents to determine whether to approve the loan and/or to determine the terms of the loan, such as the interest rate, the schedule for repayment, and so on. Examples of financial documents include pay stubs, checks (e.g., cancelled check evidencing payment of rent or other expenses), payment receipts, tax documents, and financial statements (e.g., bank statements or investment account statements). The bank may require the customer to provide different types of financial documents for different bank applications. For example, the bank might only require the customer to provide one pay stub to qualify for a $1,000 credit card limit, but might require the customer to provide additional documentation to qualify for a $100,000 mortgage.

In the example illustrated in FIG. 10A, the bank has requested the customer to provide pay stub 1, pay stub 2, a rent payment check, a W-2 form, a tax return, and an investment statement. The boxes marked with an "X" indicate that the customer has provided pay stub 1, the W-2 form, the tax return, and the investment statement. The unmarked boxes indicate that the customer has not yet provided pay stub 2 or the rent payment check. In some embodiments, the customer uses user device 104 to submit the financial documents, such as pay stub 2 and/or the rent payment check. For example, the customer captures an image file of the selected financial document using a camera or a scanner of user device 104. The customer then interacts with user device 104 to submit the image file via network 110 to processors 116 associated with the bank.

FIG. 10B illustrates a method that may be performed by system 100 to facilitate applying for a bank product. At step 1010, processors 116 associated with the bank receive a request from a customer. The request initiates filling out a bank application to apply for a bank product. In some embodiments, the customer uses user device 104 to provide the request to fill out the bank application. Or, the customer could initiate applying for the bank product via other suitable methods, such as by phone, mail, or in-person at a banking center.

At step 1012, processors 116 determine financial documents to be reviewed by the bank during the process of applying for the bank product. The financial documents to be reviewed could vary depending on the type of bank product, the monetary amount of the bank product, a risk level associated with the customer (e.g., based on the customer's credit history), or other factors. For example, the bank might only require the customer to provide one pay stub to qualify for a $1,000 credit card limit, but might require the customer to provide additional documentation to qualify for a $100,000 mortgage.

At step 1014, processors 116 request the financial documents from the customer. As an example, processors 116 may provide a template of bank application 1000 for the customer to fill out. In some embodiments, the template of bank application 1000 includes a questionnaire portion and the list of financial documents for the customer to provide to the bank. If the bank has already received some of the financial documents, the list may mark those financial documents as received. If the bank has not already received some of the financial documents, the list may leave those financial documents unmarked. For example, bank application 1000 of FIG. 10A shows that pay stub 2 and the rent payment check are still needed.

Figure 10E:
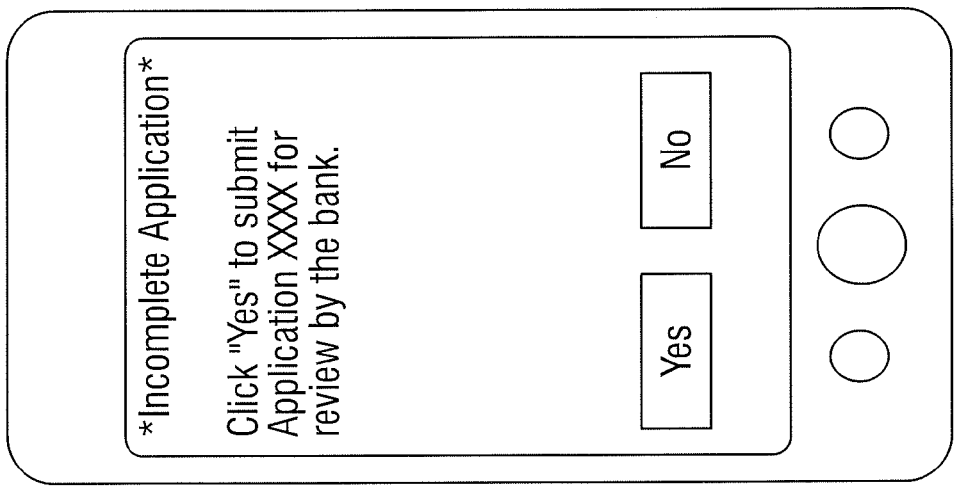
FIGS. 10C-10E illustrate examples of a user device display for preparing a bank application, in accordance with certain embodiments.
Figure 10D:
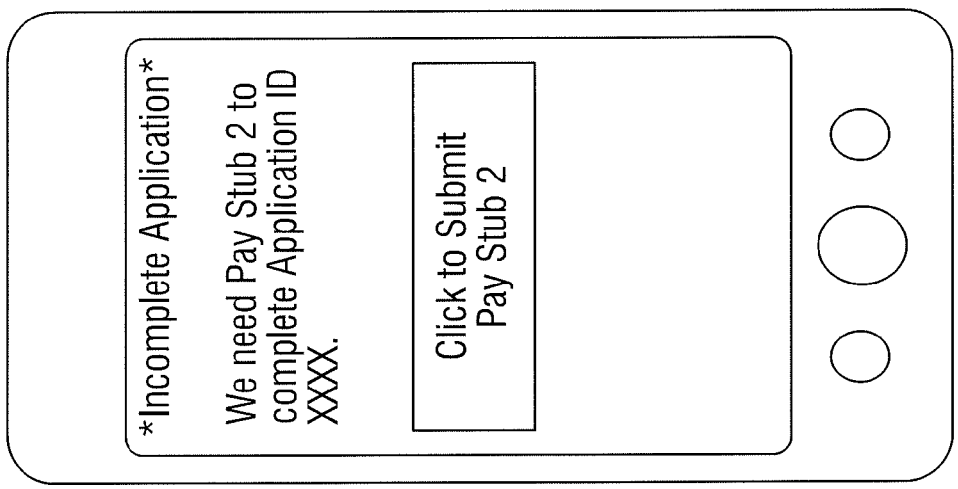
Figure 10C:
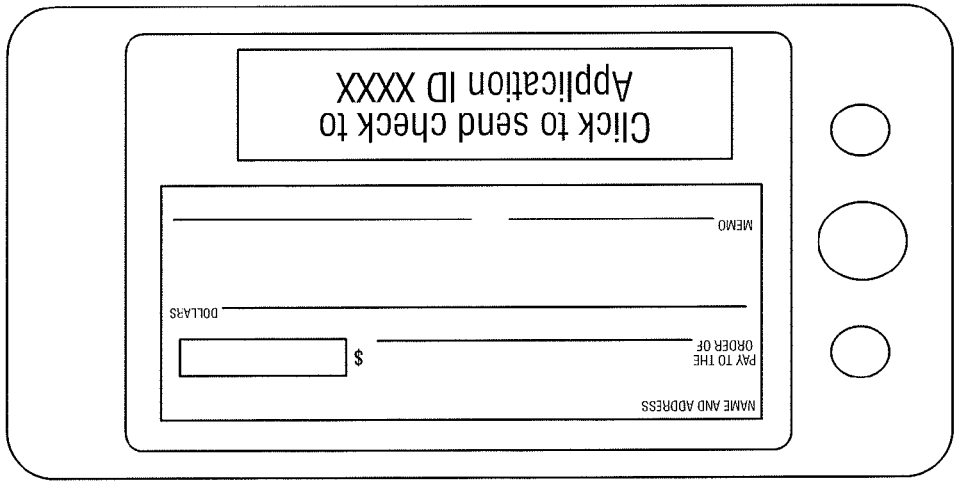

The customer interacts with user device 104 to answer the questionnaire portion and/or to provide one or more of the financial documents to the bank. To provide a financial document, the customer may capture an image of the financial document using user device 104. For example, if user device 104 has a camera, the customer may use the camera to take a picture of the financial document. Or, if user device 104 has a scanner, the customer may use the scanner to scan an image of the financial document. FIG. 10C illustrates an example in which the customer has captured an image file depicting a rent check payment using user device 104. In the example, the user device includes a button that says "Click to send check to Application ID XXXX." The customer clicks the button to send the image file depicting the rent check payment to processors 116 via a wireless and/or wired network 110. User device 104 may transmit the image file with any other suitable information, such as a customer identifier or bank application identifier. Transmitting the customer identifier and/or bank application identifier helps the bank to link the image of the financial document (e.g., the image of the rent check payment) with the corresponding bank application (application ID XXXX).

At step 1016, processors 116 receive the image file from the user device. The image file depicts the financial document that the customer selects to submit to the bank, such as the rent check payment described with respect to FIG. 10C. Processors 116 associate the image file with the corresponding bank application at step 1018. For example, processors 116 may read the Application ID XXXX from information transmitted with the image file and may associate the image of the rent check payment with other portions of Application XXXX, such as the completed questionnaire and the financial documents that were previously received (in the example, pay stub 1, W-2 form, tax return, and investment statement).

At step 1020, processors 116 determine if bank application 1000 is complete. If bank application 1000 is complete, processors 116 skip to step 1034 to send bank application 1000 to a review process. The review process reviews the completed bank application 1000 and determines whether to approve the customer's application for the bank product.

If at step 1020 processors 116 determine that bank application 1000 is not complete, processors 116 proceed to step 1022 to determine a time period for the customer to complete the bank application. The time period may correspond to a default time period based on the bank product that the customer is applying for. As examples, the default time period could be 1 week for a credit card application or 1 month for a mortgage application, although any other suitable time period could be selected as the default. Or, the time period could be determined based on customer input. For example, suppose the customer is using a software program on user device 104 to fill out bank application 1000. If the customer closes the software program before completing bank application 1000, the software program could request the customer to input a date or a number of days until the software program should remind the customer to complete bank application 1000.

At step 1024, processors 116 check to see if the time period has elapsed. If the time period has not elapsed, processors 116 return to step 1024 to wait for the time period to elapse. After the time period has elapsed, processors 116 proceed to step 1026 to again check if bank application 1026 is complete. As an example, processors 116 may determine a set of financial documents to be submitted by the customer based on the bank product that the customer is applying for and may determine whether the bank application is complete based on whether the customer has submitted each item in the set of financial documents.

If bank application 1000 is complete, processors 116 may skip to step 1034 to send bank application 1034 to the review process. If bank application 1000 is incomplete, processors 116 may proceed to step 1028 wherein processors 116 initiate communication with user device 104 in order to communicate instructions for completing the bank application. In some embodiments, communication may be initiated by text message to user device 104 or by a notification to a software program running on user device 104 (such as online banking program or a bank application app running on user device 104).

In some embodiments, the instructions for completing the bank application describe an additional financial document to be submitted by the customer. Continuing with the example above, processors 116 may determine that a second pay stub is needed in order to complete Application ID XXXX. FIG. 10D illustrates an example of a communication indicating that Application ID XXXX is incomplete because Pay Stub 2 is needed.

At step 1030, processors 116 determine if the customer responded to the instructions. In the example, processors 116 determine if the customer submitted Pay Stub 2. Processors 116 may determine that the customer submitted Pay Stub 2 using any suitable method. For example, processors 116 may determine that the customer used user device 104 to send an image file, such as a photograph or a scan depicting Pay Stub 2. Or, processors 116 may retrieve a record associated with Application ID XXXX to determine that the customer submitted Pay Stub 2. For example, if the customer submitted Pay Stub 2 in-person at a banking center, a bank employee might update a record associated with Application ID XXXX to indicate that Pay Stub 2 was provided.

If at step 1030 processors 116 determine that the customer has not responded to the instructions, processors 116 may proceed to step 1032 to determine whether to terminate the request to fill out bank application 1000, for example, based on the amount of time that has elapsed since the customer initiated Application ID XXXX at step 1010. If the processors 116 determine not to terminate the request to fill out bank application 1000, the method may go to any suitable step. As an example, in some embodiments the method may return to step 1022 to determine a time period for the customer to complete Application ID XXXX. As another example, in some embodiments the method may return to step 1028 to send the customer instructions for completing Application ID XXXX. As yet another example, in some embodiments the method may proceed to step 1034 to send Application ID XXXX to the review process (e.g., in case the completed portions of Application ID XXXX are potentially sufficient to approve the application).

If at step 1030 processors 116 determine that the customer responded to the instructions, processors 116 may return to step 1026 to determine if Application ID) XXXX is now complete. If yes, processors 116 may proceed to step 1034 to send Application ID XXXX to the review process. If no, processors 116 may proceed to step 1028 to initiate communication and communicate instructions for completing Application XXXX. In some embodiments, the instructions for completing the bank application instruct the customer how to accept submitting the bank application to a review process. FIG. 10E illustrates an example where the instructions displayed on the user device instruct the customer to click "Yes" to submit Application XXXX for review by the bank. In some embodiments, the instruction may instruct the customer to send a text message with particular key words (like "submit bank application") in order to send Application ID XXXX to the review process.

After communicating the instructions in step 1028, processors 116 may determine that the customer responded to the instructions (e.g., clicked "Yes") at step 1030, in which case the processors 116 may return to step 1026, determine the application is complete, and proceed to step 1034 to send the application to the review process so that the bank can determine whether to approve the customer's application for the bank product. The method then ends.

As can be seen in FIGS. 10C-10E, user device 104 can be used to facilitate filling out bank application 1000. In some embodiments, user device 104 comprises a user input interface, a network interface, an image capturing unit, a display screen, one or more processors, and memory. The memory comprises a non-transitory computer readable medium containing instructions that, when executed by the one or more processors, cause user device 104 to perform its functionality.

User 102 may enter a request to prepare a bank application for a bank product via the user input interface of user device 102. The user input interface could be a touchscreen, a keypad, a keyboard, a voice command prompt, or other user input interface. The request may request to prepare a new bank application. Or, the request may request to prepare a bank application that is in progress (e.g., if the user wishes to submit financial documents or other information in an application that has been partially filled out). In response to the request to prepare the bank application, user device 104 retrieves a list of financial documents to be included with the bank application and displays the list to user 102. User device 104 may retrieve the list from internal memory or by requesting the list from processors 116 associated with the bank. User 102 can select a financial document on the list to provide to the bank in an image file format. User 102 may interact with user device 104 to capture an image file depicting the selected financial document. The image file is captured using the image capturing unit, such as a camera that captures a picture of the financial document or a scanner that generates a scan of the financial document.

Processors of user device 104 associate the image file with a corresponding bank application identifier (e.g., bank application XXXX) and communicate, via user device 104's network interface, the image file and the bank application identifier. The communication is sent through network 110 to the bank's computing resources, such as processor 116. The image file can be communicated with an indication of which financial document is depicted in the image file (e.g., an indication if the image file depicts pay stub 2, a rent payment check, etc.).

As discussed with respect to FIG. 10B, the computing resources associated with the bank receive the image file (e.g., step 1016) and can interact with user device 104 to prompt the user to provide any additional financial documents, information, or authorization to complete the bank application. As an example, user device 104 can determine a time period for completing the bank application. The time period can be determined in any suitable manner, such as based on user input, based on a timer value provided by the bank (e.g., via processors 116), or based on a default timer setting configured in an bank application app running on user device 104.

If user device 104 determines that the bank application is incomplete after the time period has elapsed (e.g., if the customer has not submitted all of the financial documents on the list), user device 104 may communicate/display instructions for completing the bank application. The instructions may include an updated list of the financial documents to be included with the bank application, wherein the updated list includes an indication of which financial documents the customer has already submitted to the bank and which financial documents the customer still needs to submit to the bank. User device 104 may determine the financial documents that the customer has already submitted by keeping track of the financial documents submitted via user device 104 and/or by retrieving bank application status information from the bank (e.g., via processors 116 associated with the bank). If user device 104 determines that each financial document on the list of financial documents has been submitted to the bank, user device 104 may communicate/display instructions instructing the customer how to accept submitting the bank application to a review process.

Although the preceding examples describe an allocation of functionality between processors 116 and user device 104, in alternate embodiments the various functionalities may be divided between these components or other components in any suitable manner.

Figure 11:
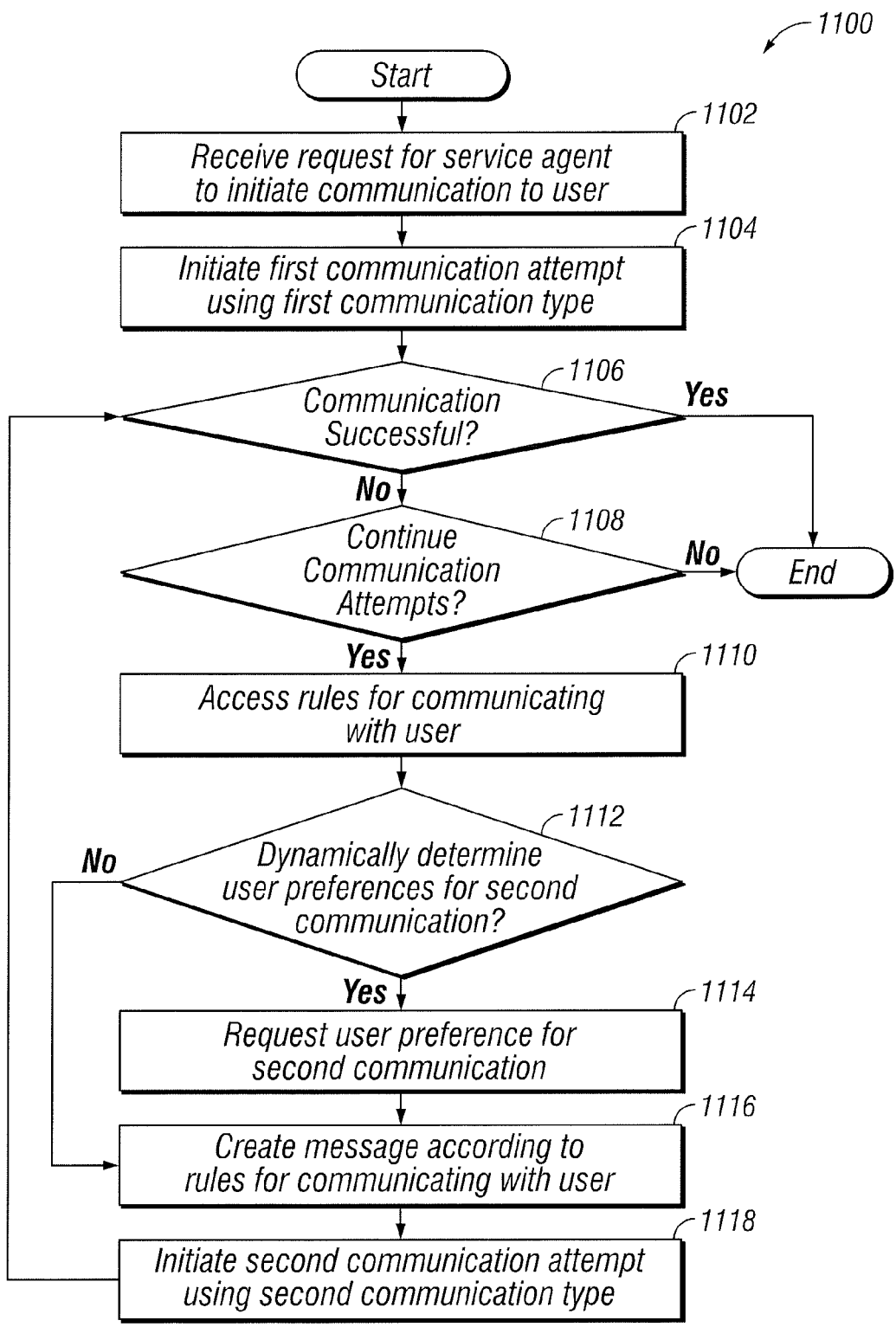
FIG. 11 illustrates an example method that initiates follow-up communications to a user following an unsuccessful communication attempt, in accordance with certain embodiments.

FIG. 11 illustrates an example method 1100 that initiates follow-up communications to a user following an unsuccessful communication attempt. In certain embodiments, a server, such as server 114 associated with enterprise 112, may have access to many techniques for communicating with a user. The enterprise may attempt to contact the user to provide information regarding a user's attempt to open an account with the enterprise, accounts already established with the user, a user's attempts and/or agreements to settle past due bills, and/or for any other suitable reason. The enterprise may communicate (or attempt to communicate with the user) through a graphical user interface accessed by an online website/application associate with the enterprise, phone calls (initiated through an IVR, live agent, or other suitable service agent), e-mail, and/or by any other suitable communication type. Additionally, server 114 may set up an in-person communication between a user and a representative of enterprise 112 at a physical location associated with the enterprise.

In certain embodiments, components of system 100, such as processor 116, may execute rules or instructions stored in communication follow-up module 126f and/or any other suitable module to perform the steps of method 1100. Additionally, other modules 126 may utilize communication follow-up module 126f when communicating with a user using user devices, such as user devices 104 of system 100. Certain modules, such as communication follow-up module 126f, may include rules for determining communication types for particular users 102 and the order in which particular communication types should be used.

The method may begin at step 1102, where a request may be received for a service agent associated with enterprise 112 to contact a particular user 102. The request may be received by any suitable communication type, such as phone, e-mail, chat session, and/or in-person communication, as non-limiting examples. The request may include one or more communication types that comprise options for contacting the user, such as by phone, e-mail, chat session, and/or in-person communication.

In certain embodiments, the request may be made by a user via a graphical user interface, such as GUI 106 on user device 104 of system 100. The graphical user interface may facilitate access to an on-line communications site associated with the enterprise, such as one that enables the user to gain access to information associated with past due bills or payments for certain user accounts. A click-to-call option on the user interface may allow the user to enter a callback number for a service agent (automated and/or human) associated with enterprise 112 to call to contact the user.

At step 1104, processor 116 may initiate a first communication attempt to the user using a first communication type in response to receiving the request in step 1102. This may be via a communication type specified in the request. In certain embodiments, upon selection of a click-to-call option on the graphical user interface, processor 116 may access a stored number associated with the user and set up the call between the user and a service agent automatically. The number may be stored in user data 127, for example.

At step 1106, the method, through processor 116, determines whether the first communication attempt using the first communication type is successful. The method may determine whether the communication attempt is successful by determining that the user answered a phone call, responded by phone call, responded by e-mail, responded by chat, accessed an account within a specified amount of time following the communication attempt (e.g., within 2 hours, 24 hours, 1 week, etc.), any other suitable determination metric, and/or any suitable combination of the preceding. If the communication is deemed successful, the method may end. If the communication attempt is not deemed successful, the method may proceed to step 1108.

At step 1108, the method, through processor 116, may determine whether to follow-up with another communication attempt. If not, such as if all the predetermined communication attempts have been exhausted, the method may end. If another communication is attempted, the method may proceed to step 1110.

At step 1110, the method, through processor 116, accesses rules for communicating with the user. The rules, which may be stored in follow-up communication module 126f and/or user data 127, may include instructions for initiating follow-up communication attempts to a user. The rules may be based on preferences of the user, the type of user device used to make the request, the type of user device the user is currently using to gain online access to a website or other network accessible content associated with enterprise 112, and/or any other suitable factor. As an example, a rule may indicate that if the first communication attempt was a call made in response to a click-to-call request made via the graphical user interface on a desktop/laptop computer, the server 114 may initiate a proactive session using chat initiation module 126c, for example, while the user is still accessing the network accessible content. As another example, the rules may indicate that the follow-up communication attempt should be via an e-mail or SMS text message, if the user made the initial request using a mobile phone user device, and/or the user is currently using a mobile phone user device to access the online environment associated with the enterprise.

In certain embodiments, the rules may instruct processor 116 to determine schedule information associated with the user. For example, processor 116 may instruct a processor on the user device to access calendar information of the user to determine a time period that is free for the user. The rules may also instruct processor 116 to determine free time periods of any suitable live service agent. Processor 116 may then suggest a time period for an appointment between the user and the service agent.

In certain embodiments, the rules may instruct processor 116 to determine geographic data associated with the user. For example, processor 116 may instruct a processor on the user device to determine location information associated with the location of the user device, such as through GPS information. The processor on the user device may facilitate communication of a message to the server 116 when the user has left the vicinity of a location associated with a "work" identifier on the user phone. The rules may instruct processor 116 to initiate the follow-up communication attempt with the user upon receiving the message indicating that the user is no longer at "work" or at another specified location. The rules also may be associated with any suitable location, such as a "home" location. The rules may be inverted such that processor 116 is instructed to initiate a communication attempt when the user is within a certain distance from a location, such as a "home."

In certain embodiments, the rules may instruct processor 116 to conduct the follow-up communication attempt when the user travels a certain distance away from where the user was geographically located when the communication attempt was unsuccessful. This may be useful, for example, in contacting a user who was occupied running an errand at an arbitrary location when the first communication was attempted, but then moved away from that location when the errand was completed. The geographic data may also be helpful, for example, to determine a physical location associated with enterprise 112 (e.g., a branch location) where the user could speak to a live service agent in person. The geographic data of the user device may help in locating a physical location near to the user's current location and/or near to the user's home, place of work, or any other suitable location.

At step 1112, processor 116 may determine whether to dynamically determine the user preferences for a second communication attempt. This may be specified in the user communication rules. For example, after a request is received for a first communication attempt and/or upon determining that a communication attempt is needed to the user such as by alert module 126a, processor 116 may send instructions to GUI 106 on user device 104 to display messages asking for the user to specify preferred communication types. In certain embodiments, the messages may allow a user to specify multiple communication types and/or the preferred order for using the various types of communication. As an example, the user may specify one or more of phone, e-mail, text message, chat session, and/or any other suitable communication type. The user may also specify that the chat session should be attempted and, if that is unsuccessful, then to attempt a phone call. If the preferences should be determined dynamically, the method proceeds to step 1114.

At step 1114, processor 116 facilitates communication of instructions to GUI 108 of user device 104 to request preferences for communication types of the user as discussed above. The preferences may then be communicated to server 114, which may store them in user data 127 associated with the user.

At step 1116, processor 116 creates a message to be communicated to the user via the chosen communication type. For example, the message may request an appointment with the user according to the schedule information associated with the user and the geographic data associated with the user.

At step 1118, the second communication attempt may be initiated according to the rules and user preference information. This communication attempt may be in response to determining that the first communication attempt was not successful. In certain embodiments the second communication type may be different from the first communication type. Trying different communication types to reach the user may increase the chances of successfully communicating with the user. At step 1106, the method may return back to step 1106, where processor 1106 determines whether the communication attempt was successful according to any suitable metric, such as those discussed above.

Modifications, additions, or omissions may be made to method 1100 described herein without departing from the scope of the invention. For example, the steps may be combined, modified, or deleted where appropriate, and additional steps may be added. Additionally, the steps may be performed in any suitable order (including in parallel) without departing from the scope of the present disclosure.

Figure 12A:
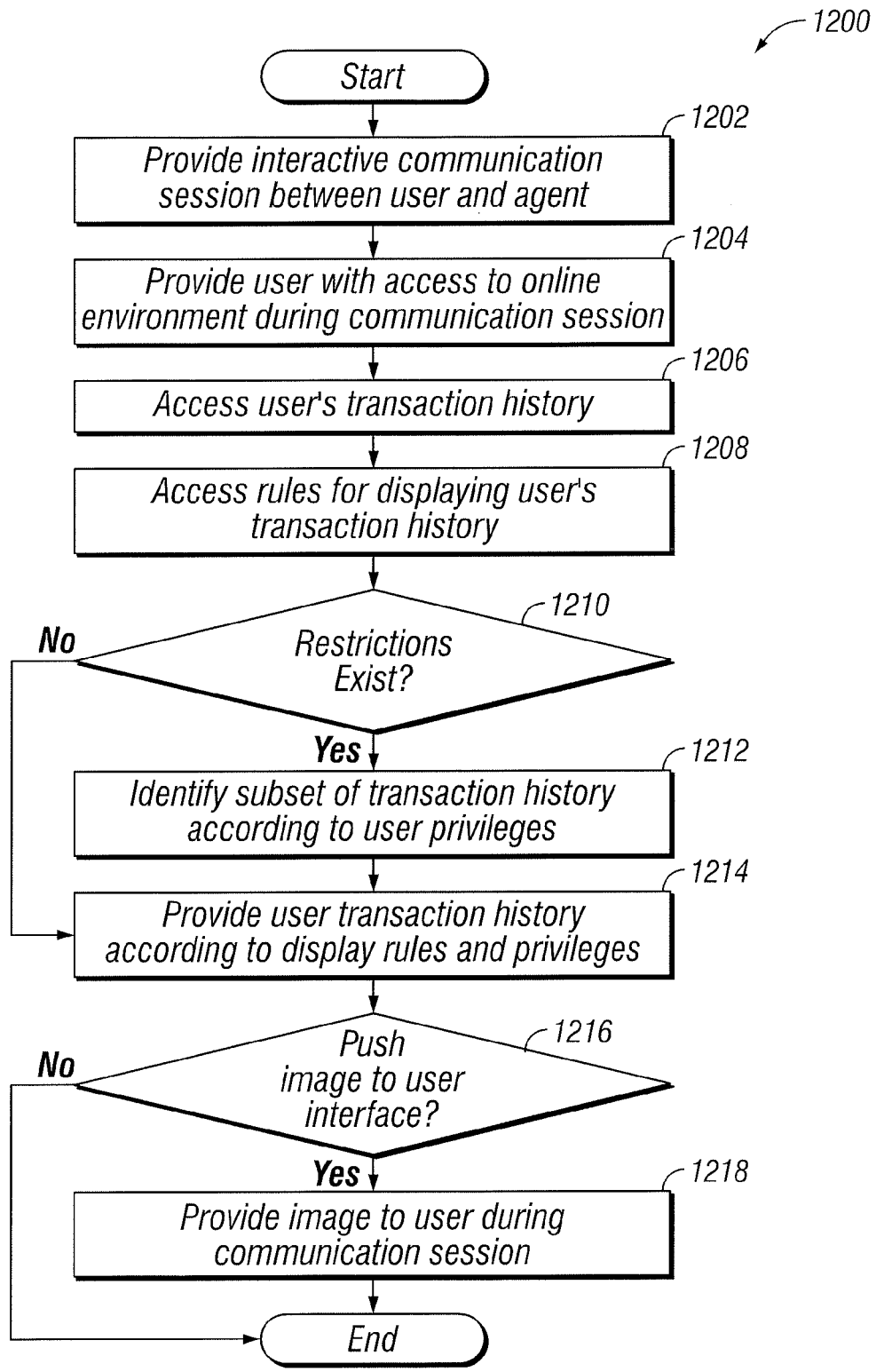
FIG. 12A illustrates an example method that provides information associated with a user's transaction history to the user via a graphical user interface displayed on a user device, in accordance with certain embodiments.

FIG. 12A illustrates an example method 1200 that provides information associated with a user's transaction history to the user via a graphical user interface displayed on a user device. The transaction history may be associated with one or more accounts administered by an enterprise. The transaction history may be displayed to the user while the user is interacting with a service agent, which may help to facilitate discussion and resolution of issues associated with the user's account(s). The interaction between the user and the service agent may occur in any suitable manner, such as by phone and/or real-time chat session. In certain embodiments, the transaction history may relate to resolution/settlement of a user's past due bill. Method 1200 may beneficially impact the user experience by allowing the user to view many, if not all, of the user's past transactions associated with the enterprise while interacting with a service agent in real-time. In certain embodiments, the service agent may be able to push certain images (such as prior agreements/disclosures) onto the display of the user device during the interactive session.

In certain embodiments, components of system 100, such as processor 116, may execute rules stored in service agent module 126g and/or any other suitable module to perform the steps of method 1200. Additionally, other modules 126 may utilize service agent module 126g, such as alert module 126a, when communicating with a user using user devices, such as user devices 104 of system 100. Certain modules, such as service agent module 126g, may include rules for displaying particular portions of a user's transaction history.

The method may begin at step 1202 in which processor 116 facilitates an interactive communication session between a user and a service agent associated with enterprise 112. The interactive communication session may comprise a phone call, chat session, videoconference, any other mechanism for allowing a service agent and a user to communicate back and forth in real-time, and/or any suitable combination of the preceding. The service agent may be a live service agent and/or an automated agent preprogrammed to provide responses based on input/questions posed by the user. The responses may be provided orally (e.g., over the phone) and/or in a text-based format (e.g., over a chat session).

At step 1204, the method, using processor 116, provides the user access to an online environment during the interactive communication session through a graphical user interface on the user device. As non-limiting examples, the access may be provided when a user logs in to a website (or other network accessible application) that provides access to information associated with a user's account, such as an online banking website. The access may be provided via a web browser, native application, and/or any other suitable software available on a user device.

At step 1206, the method, using processor 116, accesses the user's transaction history. The user's transaction history, in certain embodiments, may be stored in user data 127.

At step 1208, the method, using processor 116, accesses rules for displaying a user's transaction history. The transaction history may relate to one or more accounts administered by an enterprise. The transaction history for a particular user may be stored in user data 127, for example. In certain embodiments, the transaction history may relate to all transactions associated with user, including those that do not involve the user directly. For example, an associate with the enterprise may review the history of the user's account and provide a report comprising, for example, particular strategies to take with respect to collection of past due bills of a user's account. As another example, an associate and/or service agent may make notes during an interactive session with the user. Additionally, certain user accounts may have payments made by someone other than the user.

The rules may contain restrictions for certain information in the user's transaction history that should not be displayed to the user via the graphical user interface. In certain embodiments, the rules may be permissive, such that they contain privileges for certain information in the user's transaction history that the user is affirmatively allowed to view via the graphical user interface, while excluding all other information.

For example, a rule may prohibit a user from viewing certain transaction types in the user's transaction history, such as service agent reports. As another example, a rule may prohibit a user from viewing the identity of the payor of a payment made by someone other than the user on the user's account(s).

At step 1210, the method, using processor 116, determines whether the rules indicate whether any restrictions exist for displaying the user's transaction history to the user. If not, the method proceeds to step 1214. If so, the method proceeds to step 1212.

At step 1212, the method, using processor 116, identifies the subset of the transaction history displayable to the user based on the rules, which may be less than all items in the user's transaction history. In certain embodiments, the method may allow display of more of the user's transaction history. For example, a parent may be able to view more transactions associated with an account than a child who has access to the account. As another example, a service agent associated with the enterprise may be able to view more than either the parent or child. In some cases, the service agent may be able to view the entire transaction history associated with the user, including reports made by one or more other service agents.

In particular embodiments, the method may identify the user's promise to perform an action associated with the enterprise, such as a promise to make a payment on a past due bill. The method may also identify a prior action performed by the user, such as a prior payment. The method may also identify a prior communication between the user and the enterprise, for example, a prior chat session and/or telephone call.

At step 1214, the user's transaction history is provided to the user. Processor 116 may instruct interface 116 to provide content to display on the graphical user interface comprising the unrestricted portion of the user's transaction history.

At step 1216, the method, using processor 1216, determines whether to push an image to the user's graphical user interface. For example, during the interactive communication session between the user and the service agent, an image may be provided over the user's display screen that relates to one or more of the items in the user's transaction history. As an example, this may be useful to show the user the terms on which the user agreed to settle a past due bill. As another example, the service agent may push alternative repayment schemes onto the user's graphical user interface as provided by repayment plan module 126b. If an image will be pushed to the user's graphical user interface, the method may proceed to step 1218, where processor 116 may facilitate delivery of image content to the graphical user interface via interface 116. In certain embodiments, the step 1214 for providing the user's transaction history and step 1218 of providing an image to the user may occur while the interactive communication session between the user and the service agent is on-going. If no image will be pushed to the user's graphical user interface, the method may end.

Modifications, additions, or omissions may be made to method 1200 described herein without departing from the scope of the invention. The steps may be combined, modified, or deleted where appropriate, and additional steps may be added. Additionally, the steps may be performed in any suitable order (including in parallel) without departing from the scope of the present disclosure.

FIG. 12B illustrates an example embodiment of a GUI 1250 that provides information associated with a user's transaction history to the user via a graphical user interface displayed on a user device for a bank enterprise. GUI 1250 includes a transaction history selector 1252 that a user may select to display the user's transaction history. Upon selection by the user, an unrestricted portion of the user's transaction history may be displayed in transaction history display 1254. Transaction history display 1254 may provide any suitable information associated with one or more transactions. For example, transaction history display 1254 presents items in a transaction history with date and transaction type along with various details associated with the transaction in a "notes" portion of the display. The "notes" portion for communication transactions includes the method in which the user used to communicate with the bank. In certain embodiments, other transaction types may also display the method used for the transaction. For example, the "Promise to Pay" transaction may include the communication method used to make the promise to pay (e.g., phone, online interface, etc.).

Chat session 1258 includes real-time messages exchanged between the user and a service agent associated with the bank enterprise. Chat session 1258 may be initiated by the user or proactively initiated by chat initiation module 126c. Chat session 1258 allows the service agent to answer questions of the user and/or provide any other suitable information, such as the terms of the agreement of a prior date. The service agent may push the image onto display window 1256 of GUI 1250. Displaying the terms of the agreement may facilitate more useful discussion between the user and the service agent. Modifications, additions, or omissions may be made to GUI 1250 described herein without departing from the scope of the invention.

Modifications, additions, or omissions may be made to the systems described herein without departing from the scope of the invention. The components may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure.

Although the present invention has been described in detail, it should be understood that various changes, substitutions, and alterations can be made hereto without departing from the scope of the invention as defined by the appended claims.

What is claimed is:

1. A system, comprising:
    one or more processors communicatively coupled to an interface, and configured to:
        calculate, by the one or more processors, a user risk score associated with a user, the user risk score based on a user payment history;
        determine, by the one or more processors, a question length correlating with a type of user device;
        determine, by the one or more processors, a number of questions correlating with the user risk score;
        select, by the one or more processors, a first subset of repayment questions from a set of repayment questions based on the determined question length and the determined number of questions;
        communicate, using the interface, the first subset of repayment questions to the user via a user device;

receive, using the interface, answers to the first subset of repayment questions from the user via the user device;

determine, by the one or more processors, a second subset of repayment questions based on the answers to the first subset of repayment questions;

communicate, using the interface, the second subset of repayment questions to the user via the user device; and receive, using the interface, answers to the second subset of repayment questions from the user via the user device;

perform, by the one or more processors, a verification to determine whether the answers to the first subset of repayment questions are accurate by comparing the answers to the first subset of repayment questions to user information associated with the user; and determine, by the one or more processors, a third subset of repayment questions when the verification indicates that the answer to one or more of the first subset of repayment questions is not accurate;

communicate, using the interface, the third subset of repayment questions to the user from the user via the user device; and receive, using the interface, answers to the third subset of repayment questions from the user via the user device;

determine, by the one or more processors, a plurality of repayment plans based on the user risk score, the answers to the first subset of repayment questions, the answers to the second subset of repayment questions, and the answers to the third subset of repayment questions; and communicate, using the interface, one or more of the plurality of determined repayment plans to the user via the user device.

2. The system of claim 1, wherein to communicate the one or more of the plurality of repayment plans to the user via the user device, the interface is further configured to communicate a highest priority repayment plan of the plurality of payment plans.

3. The system of claim 2, wherein the interface is further configured to:
receive a response to communicating the highest priority repayment plan; and
communicate a second highest priority repayment plan of the plurality of payment plans when the response indicates the user rejects the highest priority repayment plan.

4. The system of claim 1, wherein the interface is further configured to communicate each repayment plan of the plurality of repayment plans prior to receiving a response that indicates the user accepts or rejects any of the repayment plans.

5. The system of claim 1, wherein the interface is further configured to:
communicate an approval request for the plurality of repayment plans to an authorization team; and
receive an approved message from the authorization team.

6. The system of claim 1, wherein the one or more processors are further configured to generate a request to an external source for the user information associated with a user; and
wherein the interface is further configured to receive a response from the external source providing the user information associated with the user.

7. The system of claim 1, wherein the interface is further configured to:
receive an acceptance from the user accepting one of the repayment plans in the plurality of repayment plans;
receive billing information from the user; and
communicate the accepted repayment plan and billing information to an external payment service.

8. The system of claim 1, wherein the first subset of questions is different than the second subset of questions.

9. A non-transitory computer readable storage medium comprising logic, the logic, when executed by a processor, operable to:
calculate a user risk score associated with a user, the user risk score based on a user payment history;
determine a question length correlating with a type of user device;
determine a number of questions correlating with the risk user score;
select a first subset of repayment questions from a set of repayment questions based on the determined question length and the determined number of questions;
communicate, using a communication interface, the first subset of repayment questions to the user via a user device;
receive answers to the first subset of repayment questions from the user via the user device;
determine a second subset of repayment questions based on the answers to the first subset of repayment questions;
communicate, using the communication interface, the second subset of repayment questions to the user via the user device;
receive answers to the second subset of repayment questions from the user via the user device;
perform a verification to determine whether the answers to the first subset of repayment questions are accurate by comparing the answers to the first subset of repayment questions to user information associated with the user; and
determine a third subset of repayment questions if the verification indicates that the answer to one or more of the first subset of repayment questions is not accurate;
communicate, using the communication interface, the third subset of repayment questions to the user via the user device;
receive answers to the third subset of repayment questions from the user via the user device;
determine a plurality of repayment plans based on the user risk score, the answers to the first subset of repayment questions, the answers to the second subset of repayment questions, and the answers to the third subset of repayment questions; and
communicate, using the communication interface, one or more of the plurality of determined repayment plans to the user via the user device.

10. The logic of claim 9, wherein to communicate the one or more of the plurality of repayment plans to the user via the user device, the logic is further operable to communicate a highest priority repayment plan of the plurality of payment plans.

11. The logic of claim 10, the logic further operable to:
receive a response to communicating the highest priority repayment plan; and
communicate a second highest priority repayment plan of the plurality of payment plans when the response indicates the user rejects the highest priority repayment plan.

12. The logic of claim 9, the logic further operable to communicate each repayment plan of the plurality of repayment plans prior to receiving a response that indicates the user accepts or rejects any of the repayment plans.

13. The logic of claim 9, the logic further operable to:
communicate an approval request for the plurality of repayment plans to an authorization team; and
receive an approved message from the authorization team.

14. The logic of claim 9, the logic further operable to:
generate a request to an external source for the user information associated with a user; and
receive a response from the external source providing the user information associated with the user.

15. The logic of claim 9, the logic further operable to:
receive an acceptance from the user accepting one of the repayment plans in the plurality of repayment plans;
receive billing information from the user; and
communicate the accepted repayment plan and billing information to an external payment service.

16. A method, comprising:
calculating, by a processor, a user risk score associated with a user, the user risk score based on a user payment history;
determining, by the processor, a question length correlating with a type of user device;
determining, by the processor, a number of questions correlating with the user risk score;
selecting, by the processor, a first subset of repayment questions from a set of repayment questions based on the determined question length and the determined number of questions;
communicating, by an interface, the first subset of repayment questions to the user via a user device;
receiving, by the interface, answers to the first subset of repayment questions from the user via the user device;
determining, by the processor, a second subset of repayment questions based on the answers to the first subset of repayment questions;
communicating, by the interface, the second subset of repayment questions to the user via the user device;
receiving, by the interface, answers to the second subset of repayment questions from the user via the user device;
performing, by the processor, a verification to determine whether the answers to the first subset of repayment questions are accurate by comparing the answers to the first subset of repayment questions to user information associated with the user; and
determining, by the processor, a third subset of repayment questions if the verification indicates that the answer to one or more of the first subset of repayment questions is not accurate;
communicating, by the interface, the third subset of repayment questions to the user via the user device; and
receiving, by the interface, answers to the third subset of repayment questions from the user via the user device;
determining, by the processor, a plurality of repayment plans based on the user risk score, the answers to the first subset of repayment questions, the answers to the second subset of repayment questions, and the answers to the third subset of repayment questions; and
communicating, by the interface, one or more of the plurality of determined repayment plans to the user via the user device.

17. The method of claim 16, wherein communicating the one or more of the plurality of repayment plans to the user via the user device further comprises communicating a highest priority repayment plan of the plurality of payment plans.

18. The method of claim 17, further comprising:
receiving, at the interface, a response to communicating the highest priority repayment plan; and
communicating, by the interface, a second highest priority repayment plan of the plurality of payment plans when the response indicates the user rejects the highest priority repayment plan.

19. The method of claim 16, further comprising communicating, by the interface, each repayment plan of the plurality of repayment plans prior to receiving a response that indicates the user accepts or rejects any of the repayment plans.

20. The method of claim 16, further comprising:
communicating, by the interface, an approval request for the plurality of repayment plans to an authorization team; and
receiving, by the interface, an approved message from the authorization team.

* * * * *